US009602356B1

United States Patent
Dubrovsky et al.

(10) Patent No.: US 9,602,356 B1
(45) Date of Patent: Mar. 21, 2017

(54) GROUPS BASED PERFORMANCE DATA COLLECTION

(71) Applicants: Alexander Dubrovsky, Westborough, MA (US); Venkatesh Madhipatla, Westford, MA (US); Syamala Pullakhandam, Cary, NC (US); Junichi Eto, Forest, VA (US); Christopher A. Chaulk, Franklin, MA (US); Rajesh Nandyalam, Whitinsville, MA (US)

(72) Inventors: Alexander Dubrovsky, Westborough, MA (US); Venkatesh Madhipatla, Westford, MA (US); Syamala Pullakhandam, Cary, NC (US); Junichi Eto, Forest, VA (US); Christopher A. Chaulk, Franklin, MA (US); Rajesh Nandyalam, Whitinsville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 323 days.

(21) Appl. No.: 13/629,763

(22) Filed: Sep. 28, 2012

(51) Int. Cl.
*H04L 12/24* (2006.01)
*G06F 3/06* (2006.01)

(52) U.S. Cl.
CPC .............. *H04L 41/12* (2013.01); *G06F 3/067* (2013.01)

(58) Field of Classification Search
CPC .. H04L 41/0886; H04L 41/12; G06F 11/3034; G06F 11/3072; G06F 11/3409; G06F 11/3485

(Continued)

(56) References Cited

U.S. PATENT DOCUMENTS

| 5,206,939 A | 4/1993 | Yanai et al. |
| 5,742,792 A | 4/1998 | Yanai et al. |

(Continued)

OTHER PUBLICATIONS

EMC Corporation, "Diagnosing Performance Issues With ProSphere: An Introduction to Use Cases and Architecture," White Paper H8935, Sep. 2011, 14 pp.

(Continued)

*Primary Examiner* — Kevin Bates
*Assistant Examiner* — Chen-Liang Huang
(74) *Attorney, Agent, or Firm* — Muirhead and Saturnelli, LLC

(57) ABSTRACT

A system for controlled-tuning path performance data collection is provided according to group membership controlled using a tool or application. In an embodiment, criteria may be established for groups that are populated by member objects that satisfy the criteria, and performance data collection is performed for such criteria groups may be turned on or off from an interface of the tool. The tool may automatically update group membership and performance data collection characteristics according to user controlled settings but without requiring further user intervention during the updating. The described system may thereby be advantageously used in connection with management of performance data collection based on a defined groups framework in which selected groups are created, based on specified criteria, that contain objects (e.g., hosts, arrays, switches etc.) for which performance data should be collected.

19 Claims, 18 Drawing Sheets

(58) Field of Classification Search
USPC .......................................................... 709/220
See application file for complete search history.

(56) References Cited

U.S. PATENT DOCUMENTS

| | | | |
|---|---|---|---|
| 5,778,394 A | 7/1998 | Galtzur et al. | |
| 5,845,147 A | 12/1998 | Vishlitzky et al. | |
| 5,857,208 A | 1/1999 | Ofek | |
| 6,434,637 B1 | 8/2002 | D'Errico | |
| 6,622,221 B1 | 9/2003 | Zahavi | |
| 7,292,969 B1 | 11/2007 | Aharoni et al. | |
| 7,392,360 B1 | 6/2008 | Aharoni et al. | |
| 7,441,023 B2 | 10/2008 | Benjamin et al. | |
| 7,688,753 B1 | 3/2010 | Zimran et al. | |
| 7,720,003 B2 | 5/2010 | Benjamin et al. | |
| 7,779,291 B2 | 8/2010 | Yoder et al. | |
| 7,783,778 B2 | 8/2010 | Benjamin | |
| 7,827,435 B2 * | 11/2010 | Sahoo et al. | 714/4.1 |
| 8,028,062 B1 | 9/2011 | Wigmore et al. | |
| 8,838,793 B1 * | 9/2014 | Thrasher et al. | 709/226 |
| 2005/0021504 A1 * | 1/2005 | Atchison | 707/3 |
| 2006/0253715 A1 * | 11/2006 | Ghiasi et al. | 713/300 |
| 2007/0282992 A1 * | 12/2007 | Liu | 709/223 |
| 2008/0195369 A1 * | 8/2008 | Duyanovich | G06F 11/0709 703/22 |
| 2012/0233316 A1 * | 9/2012 | Nakajima | 709/224 |
| 2014/0081906 A1 * | 3/2014 | Geddam | H04L 67/1097 707/609 |

OTHER PUBLICATIONS

EMC Corporation, "EMC Symmetrix Storage Management Solution," Data Sheet H6194.2, Nov. 2010, 5 pp.
EMC Corporation, "EMC Ionix ControlCenter (formerly EMC ControlCenter) 6.0 StorageScope: Best Practices Planning," White Paper H4154 Jun. 2009, 43 pp.
U.S. Appl. No. 12/807,943, filed Sep. 17, 2010, Colon et al.
U.S. Appl. No. 13/065,806, filed Mar. 30, 2011, Smirnov et al.
U.S. Appl. No. 13/335,316, filed Dec. 22, 2011, Lim et al.
EMC Corporation, "ProSphere Discovery and Monitoring for the Modem Data Center," White Paper H8890, Aug. 2011, 17 pp.
EMC Corporation, "ProSphere: Next Generation Storage Resource Management," White Paper H8886, Aug. 2011, 13 pp.

* cited by examiner

DATA PATH DISCOVERY AND PERFORMANCE COLLECTION CONTROLLER 300

| Discovered Arrays | Discovered Switches | Discovered Fabrics | Discovered Hosts | | | |
|---|---|---|---|---|---|---|
| Discovered Arrays | | | | | | |
| Array Name | Vendor | Model | Microcode | Last Updated (GMT+5:00) | Discovery State | Path Performance Collection |
| FNM00083708224 | EMC Corp | Rack Mounted CX4_480 | 4.29.0.5.003 | 2010-10-04 16:50:03 | Failed | OFF |
| 000194900079 | EMC Corp | VMAX-1SE | 5874.229/1.041... | 2010-10-04 17:43:08 | Success | OFF |
| 000190300848 | EMC Corp | DMX4-6 | 5773.160/1.068... | 2010-10-04 17:07:59 | Success | OFF |
| 000194900188 | EMC Corp | VMAX-1SE | 5874.240/1.090... | 2010-10-04 18:12:27 | Running | ON |
| HK190807410041 | EMC Corp | Rack Mounted CX3_80 | 3.26.80.5.029 | 2010-10-04 17:20:83 | Failed | OFF |
| FNM00084320133 | EMC Corp | Rack Mounted CX4_960 | 4.29.0.5.006 | 2010-10-04 16:49:23 | Failed | OFF |
| HK190807370034 | EMC Corp | Rack Mounted CX3_20_C | 3.26.20.5.025 | 2010-10-04 17:18:37 | Success | OFF |

[ Discover ] [ Turn ON Collection ] [ Turn OFF Collection ]    Settings    [ Results ]

FIG. 9

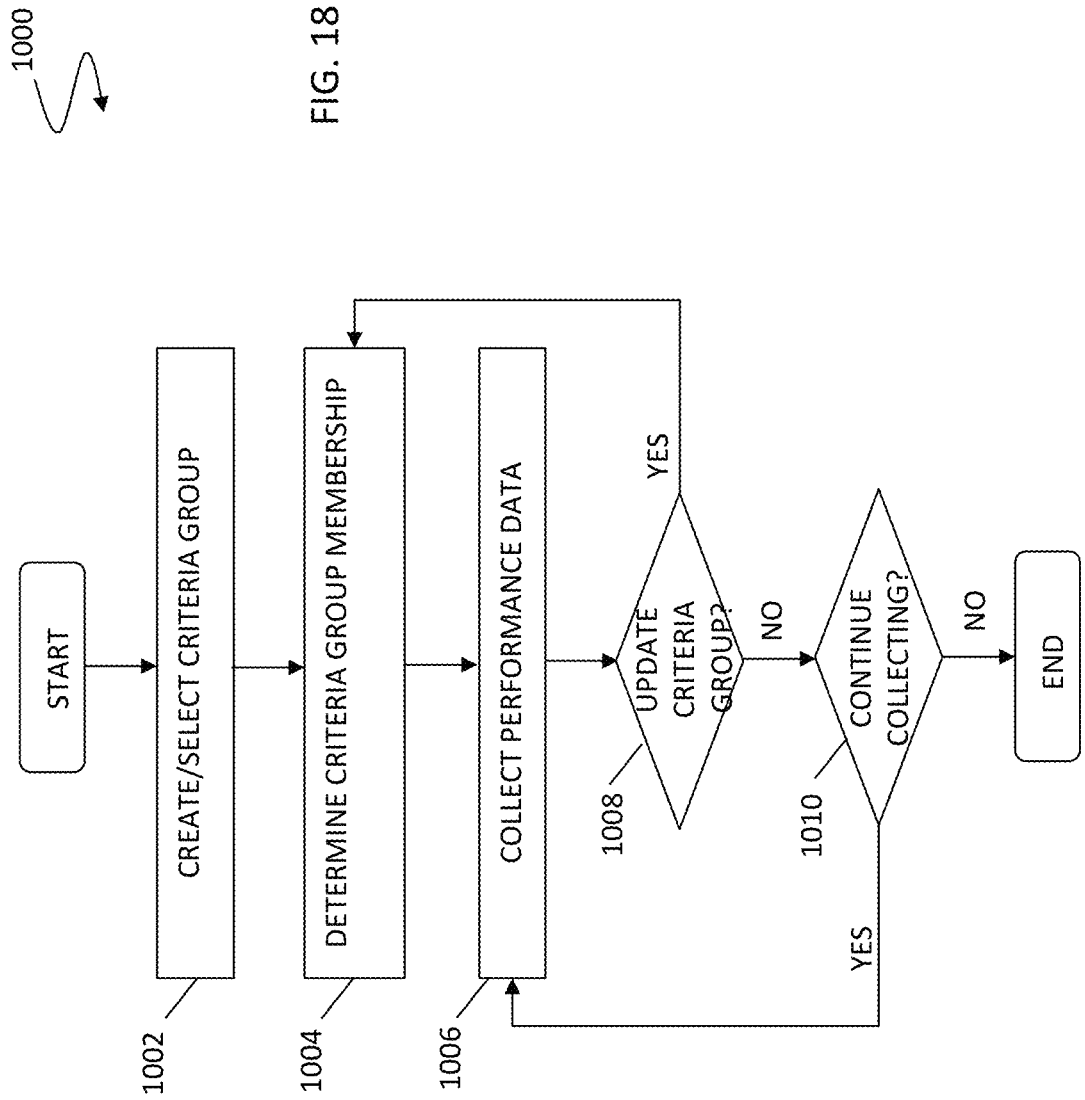

GROUPS BASED PERFORMANCE DATA COLLECTION

TECHNICAL FIELD

This application relates to storage area networks and, more particularly, to the field of performance data collection in a storage area network.

BACKGROUND OF THE INVENTION

Host processor systems may store and retrieve data using storage devices (also referred to as storage arrays) containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives.

Characteristics of the storage devices containing the data that has been stored across one or more disk drives and of elements of a storage area network (SAN) coupling the storage devices to one or more hosts may be monitored according to different performance statistics and measures. For example, I/O operations initiated by a host will result in corresponding activity in SAN fabric links, storage array ports and adapters, and storage volumes, measured in I/Os per second and Megabytes per second. Other characteristics may similarly be measured. Such characteristics may be significant factors in managing storage system performance, for example, in analyzing use of lowering access performance versus more expensive higher performance disk drives in a SAN, or by expanding number of SAN channels or channel capacity. Users may balance performance, capacity and costs when considering how and whether to replace and/or modify one or more storage devices or components.

In various circumstances, it may be desirable to collect performance data for objects of a storage system including I/O data paths between one or more hosts and one or more storage devices. Known performance data collection techniques may include a user manually determining and selecting individual managed objects for configuration to collect performance data. For example, when the I/O data paths are changed for the application host, with manual configurations a user would have to determine which managed objects changed within the I/O data paths and update performance data collection jobs accordingly to reflect the changes. Such techniques may be disadvantageously complex and subject to user error. In another example, virtual hosts (e.g., hosts running as guest operating systems or virtual machines (VM's)) may be created in a cluster of physical hosts which rely for I/O transport on previously-created, or dynamically changing, I/O data paths.

Accordingly, it would be desirable to provide a system that may be advantageously used for performance data collection, particularly in connection with changes in I/O data paths for one or more application hosts through a SAN.

SUMMARY OF THE INVENTION

According to the system described herein, a method for collecting performance data includes identifying criteria for membership in a criteria group for which performance data is to be collected. Member objects of the criteria group are determined according to the criteria. Performance data is collected corresponding to the member objects of the criteria group. Membership of the criteria group is updated. Collecting the performance data may include collecting performance data of the member objects and/or collecting performance data of elements in I/O paths of the member objects. the criteria for membership in a criteria group include object type and/or a scheduled time interval for performing performance data collection for the member objects. Collecting performance data corresponding to the member objects of the criteria group may be performed by a controller, and determining member objects of the group and updating membership of the criteria group may be performed using a controller different from the controller that collects the performance data.

According further to the system described herein, a non-transitory computer readable medium stores software for collecting performance data. The software includes executable code that identifies criteria for membership in a criteria group for which performance data is to be collected. Executable code is provided that determines member objects of the criteria group according to the criteria. Executable code is provided that collects performance data corresponding to the member objects of the criteria group. Executable code is provided that updates membership of the criteria group. The executable code that collects the performance data may include executable code that collects performance data of the member objects and/or executable code that collects performance data of elements in I/O paths of the member objects. The criteria for membership in a criteria group may include object type and/or a scheduled time interval for performing performance data collection for the member objects. the executable code that collects performance data corresponding to the member objects of the criteria group may be executed by a controller and the executable code that determines member objects of the criteria group and the executable code that updates membership of the criteria group may be executed by a controller different from the controller that collects the performance data.

According further to the system described herein, a system for collecting performance data includes a group controller that, identifies criteria for membership in a criteria group for which performance data is to be collected, determines member objects of the criteria group according to the criteria, and updates membership of the criteria group, and a performance data collection controller that collects performance data corresponding to the member objects of the criteria group. Collecting the performance data may include collecting performance data of the member objects and/or collecting performance data of elements in I/O paths of the member objects. The criteria for membership in a criteria group include object type and/or a scheduled time interval for performing performance data collection for the member objects.

BRIEF DESCRIPTION OF THE DRAWINGS

Embodiments of the system are described with reference to the several figures of the drawings, which are briefly described as follows.

FIG. 7 is a schematic illustration showing an example of a controller of the interface for controlling path performance data collection according to an embodiment of the system described herein.

FIG. 8 is a schematic illustration showing another embodiment of a controller for controlling path performance data collection according to an embodiment of the system described herein.

FIG. 9 is a schematic illustration showing a controller that may be another screen of the interface according to an embodiment of the system described herein.

FIG. 18 is a flow diagram showing processing for groups based performance data collection according to an embodiment of the system described herein.

DETAILED DESCRIPTION OF VARIOUS EMBODIMENTS

Figure 1:
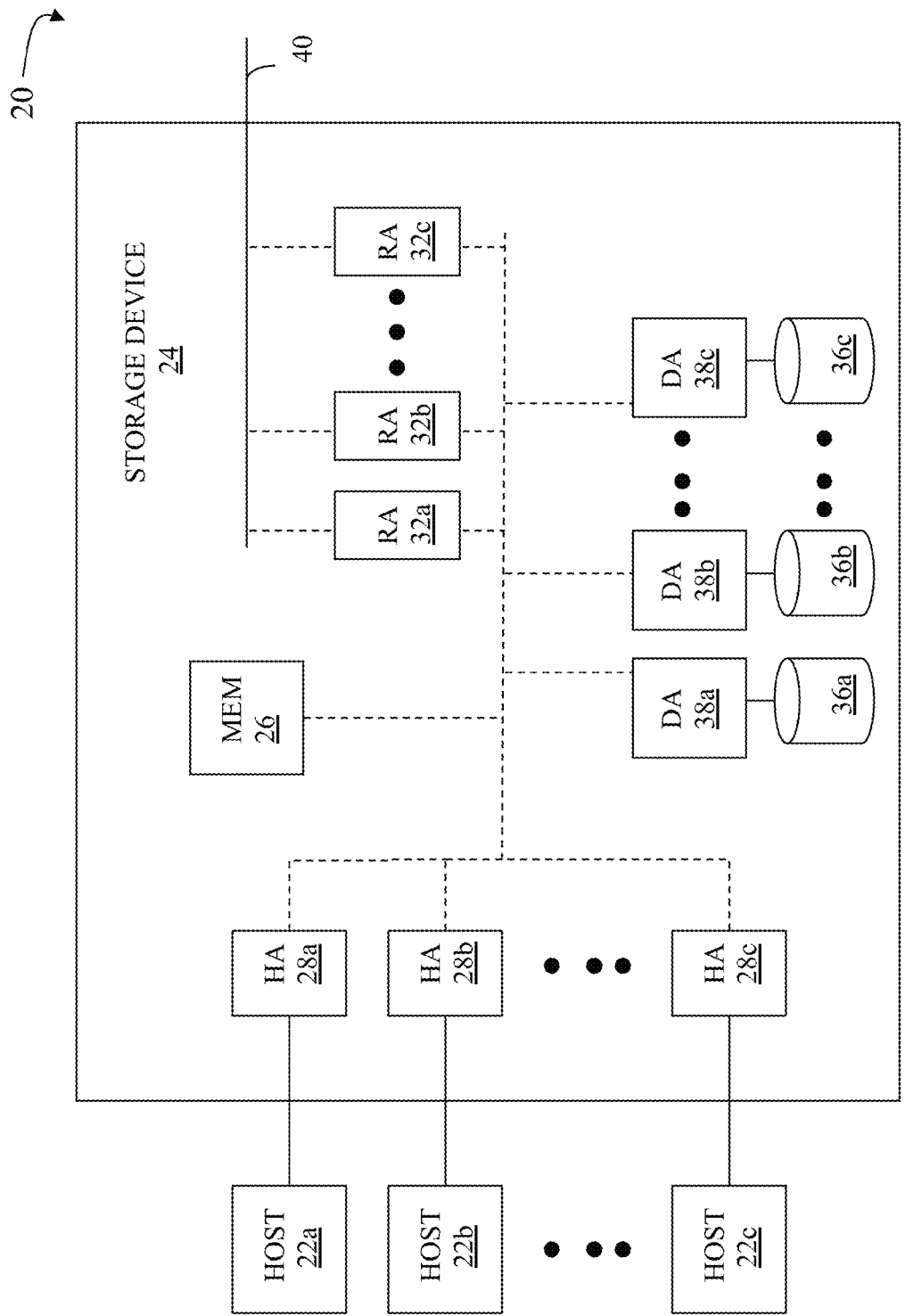
FIG. 1 is a schematic diagram showing a plurality of hosts and a data storage device that may be used in connection with the system described herein.

FIG. 1 is a schematic diagram 20 showing a plurality of hosts 22a-22c coupled to a data storage device 24 that may be used in connection with an embodiment of the system described herein. The data storage device 24 includes a memory 26 that facilitates operation of the storage device 24, as further described elsewhere herein. The data storage device also includes a plurality of host adapters (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts. In an embodiment, the storage device 24 may be a Symmetrix storage device and/or a CLARiiON storage device produced by EMC Corporation of Hopkinton, Mass.

In an embodiment, the storage device 24 may include one or more remote adapter units (RA's) 32a-32c. An RA may be used, for example, in connection with an remote data facility (RDF) product produced by EMC Corporation, may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to a remote link 40 and are similar to the HA's 28a-28c, but are used to transfer data between the storage device 24 and other storage devices that are also coupled to the remote link 40. The storage device 24 may be coupled to additional RDF links (not shown) in addition to the remote link 40. For further discussion of RDF and the use thereof in data recovery and storage techniques, see, for example, U.S. Pat. No. 5,742,792 to Yanai, et al., entitled "Remote Data Mirroring" and U.S. Pat. No. 7,779,291 to Yoder et al., entitled "Four Site Triangular Asynchronous Replication," which are incorporated herein by reference.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail. The storage device 24 may be provided as a stand-alone device coupled to the hosts 22a-22c as shown in FIG. 1 or, alternatively, the storage device 24 may be part of, and/or otherwise coupled to, a storage area network (SAN) that may include a plurality of other storage devices as well as switches, routers, network connections, etc., as further discussed elsewhere herein.

Figure 2:
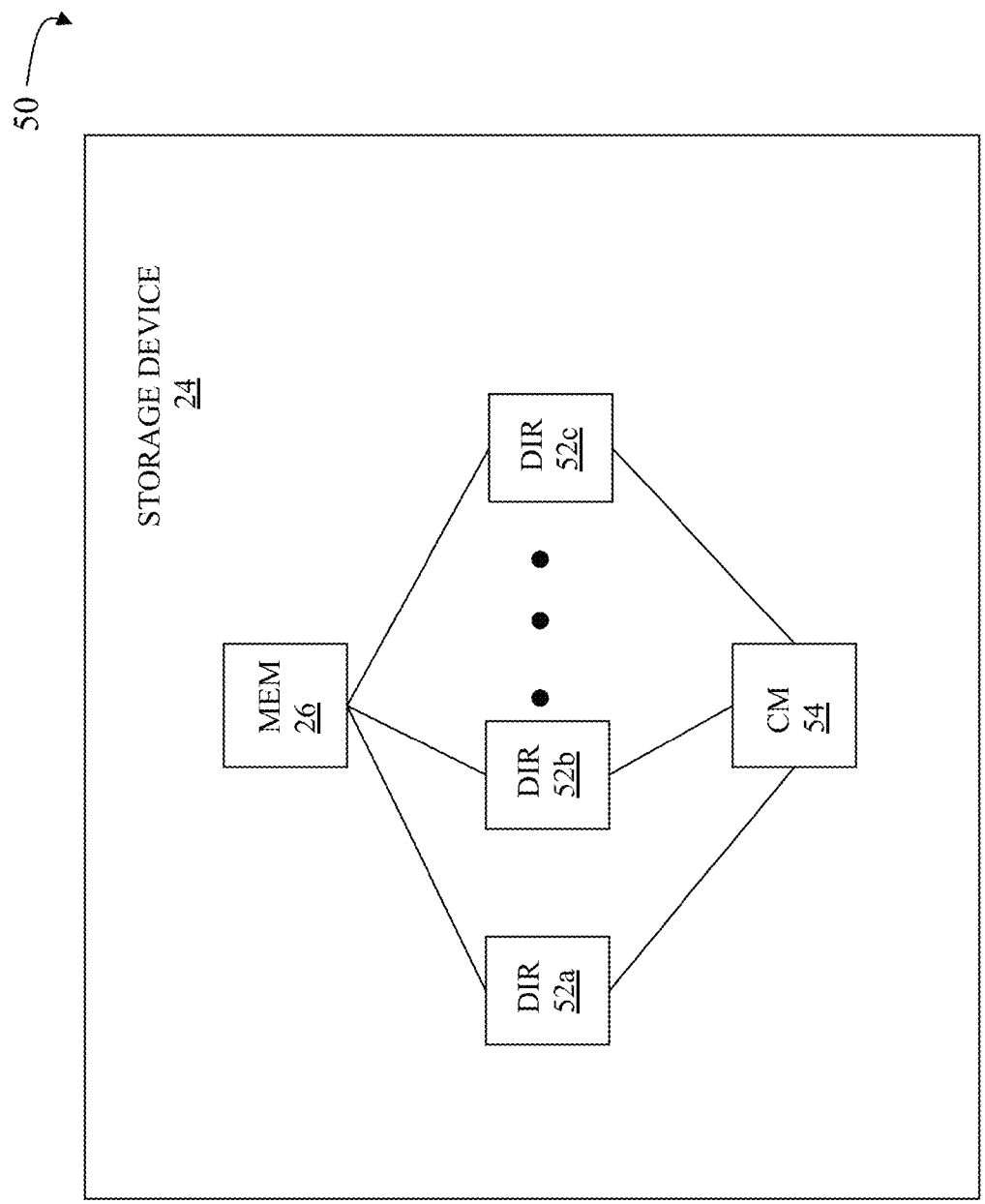
FIG. 2 is a schematic diagram showing a storage device, memory, a plurality of directors, and a communication module that may be used in connection with the system described herein.

FIG. 2 is a schematic diagram 50 illustrating an embodiment of the storage device 24 where each of a plurality of directors 52a-52c are coupled to the memory 26. Each of the directors 52a-52c may represent one of the HA's 28a-28c, RA's 32a-32c, and/or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage device and accessible by each of the storage devices.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host devices with one or more storage devices in a manner that allows reconfiguring connections without having to physically disconnect and reconnect cables from and to ports of the devices. A storage area network may be implemented using one or more switches to which the storage devices and the host devices are coupled. The switches may be programmed to allow connections between specific ports of devices coupled to the switches. A port that can initiate a data-path connection may be called an "initiator" port while the other port may be deemed a "target" port.

Figure 3:
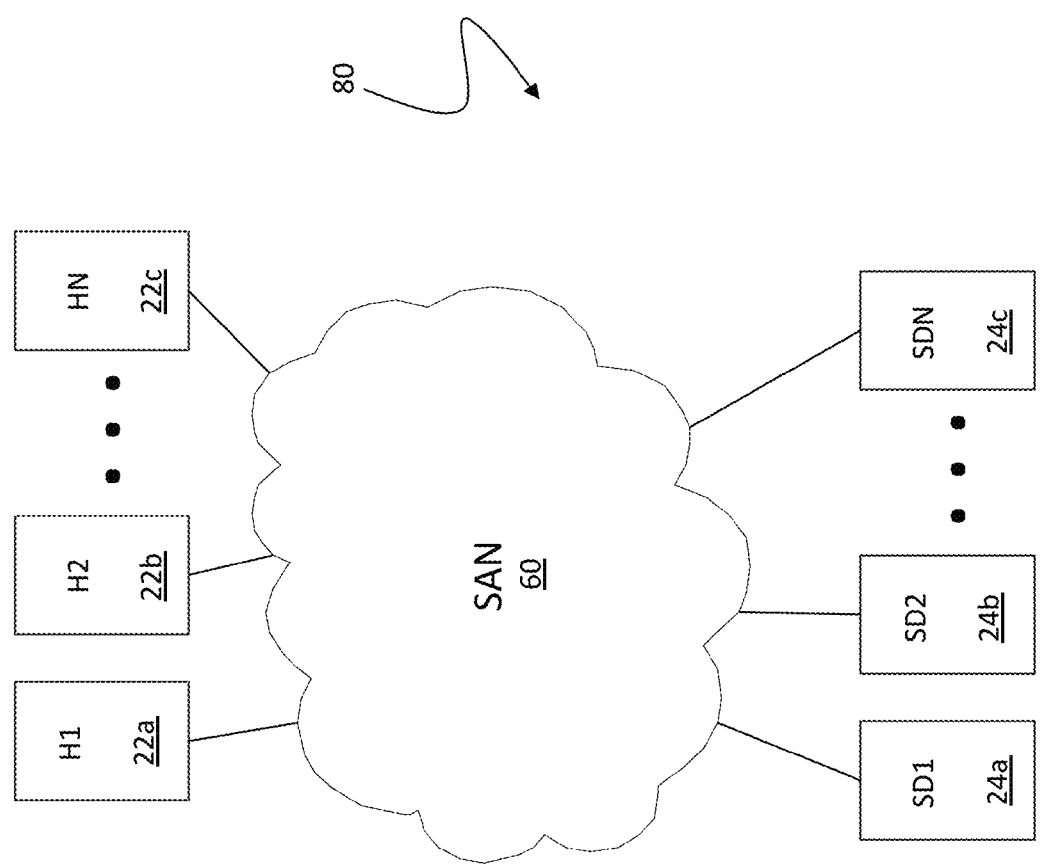
FIG. 3 is a schematic diagram showing a plurality of hosts coupled to a plurality of storage devices via a storage array network (SAN).

FIG. 3 is a schematic illustration 80 showing a storage area network (SAN) 60 providing a SAN fabric coupling a plurality of host devices (H1-HN) 22a-c to a plurality of storage devices (SD1-SDN) 24a-c. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage device 24a. Upon becoming activated (e.g., powering up), the host 22a and the storage device 24a may send appropriate signals to the switch(es) of the storage area network 60, and each other, which then allows the host 22a to initiate a data-path connection between the port of the host 22a and the port of the storage device 24a. Zones may be defined in terms of a unique identifier associated with each of the ports, such as such as a 64-bit world-wide port name (WWPN).

In various embodiments, the system described herein may be used in connection with performance data collection for data migration and/or data mirroring techniques using a SAN. Data transfer among storage devices, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from EMC Corporation.

For further discussion of techniques involving the configuration and use of storage area networks, including virtual storage area networks, references is made, for example, to U.S. Pat. No. 8,028,062 to Wigmore et al., entitled "Non-Disruptive Data Mobility Using Virtual Storage Area Networks With Split Path Virtualization," which is assigned to EMC Corporation and is incorporated herein by reference, that discloses techniques for the creation of a SAN centric storage virtualization layer that allows data mobility and migration without disruption to one or more hosts servers attached to the SAN.

Figure 4:
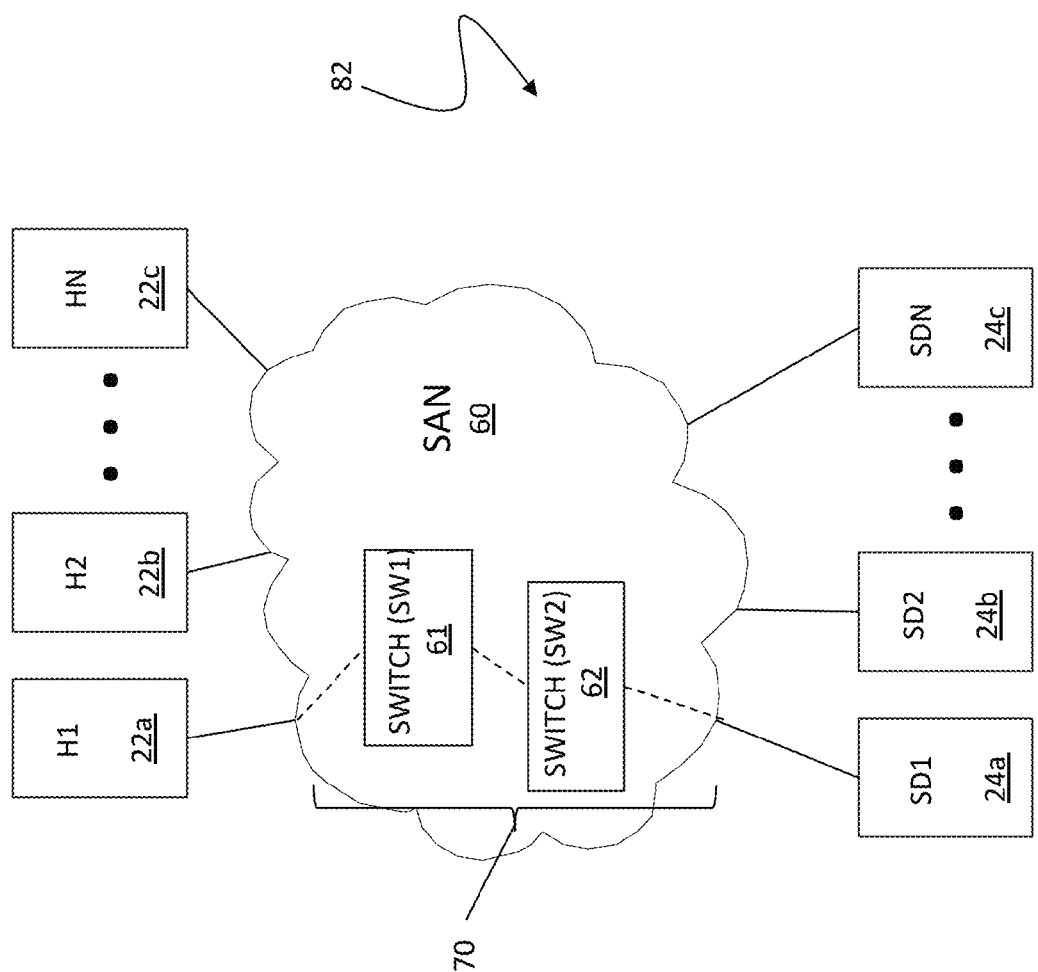
FIG. 4 is a schematic illustration of an embodiment of the SAN shown in FIG. 3 including multiple switches providing an I/O path between a host and a storage device in connection with an embodiment of the system described herein.

FIG. 4 is a schematic illustration 82 showing multiple SAN switches of a SAN, like that of FIG. 3, that may be used in connection with an embodiment of the system described herein. In the illustrated embodiment, the SAN is shown with two switches, switch 61 (SW1) and switch 62 (SW2), that are used in connection with an I/O data path 70 from the host 22a to the storage device 24a. In various embodiments, the switches 61, 62 may include physical and/or logical devices. Although two switches are shown, more than two switches and/or other appropriate elements of a SAN fabric may be used in connection with the providing of I/O data paths from one or more of the hosts 22a-c to one or more of the storages devices 24a-c in connection with path performance data collection according to the system described herein.

The selection and/or identification of the I/O path 70 may be performed according to multiple selection factors and using known path selection techniques. Reference is made, for example, to U.S. Pat. No. 7,688,753 to Zimran et al., entitled "Selection of a Data Path Based on One or More Performance Characteristics of a Computer System," which is assigned to EMC Corporation and is incorporated herein by reference and which discloses techniques for data path selection based on performance characteristics of a computer system using a path selection module. Reference is also made to U.S. Pat. No. 6,434,637 to D'Errico, entitled "Method and Apparatus for Balancing Workloads Among Paths in a Multi-Path Computer System Based on the State of Previous I/O Operations," which is assigned to EMC corporation and is incorporated herein by reference and which discloses techniques for selecting one of at least two I/O data paths for transmission of the next I/O operation based upon a state of previously assigned I/O operations queued for transmission over the I/O paths.

Figure 5:
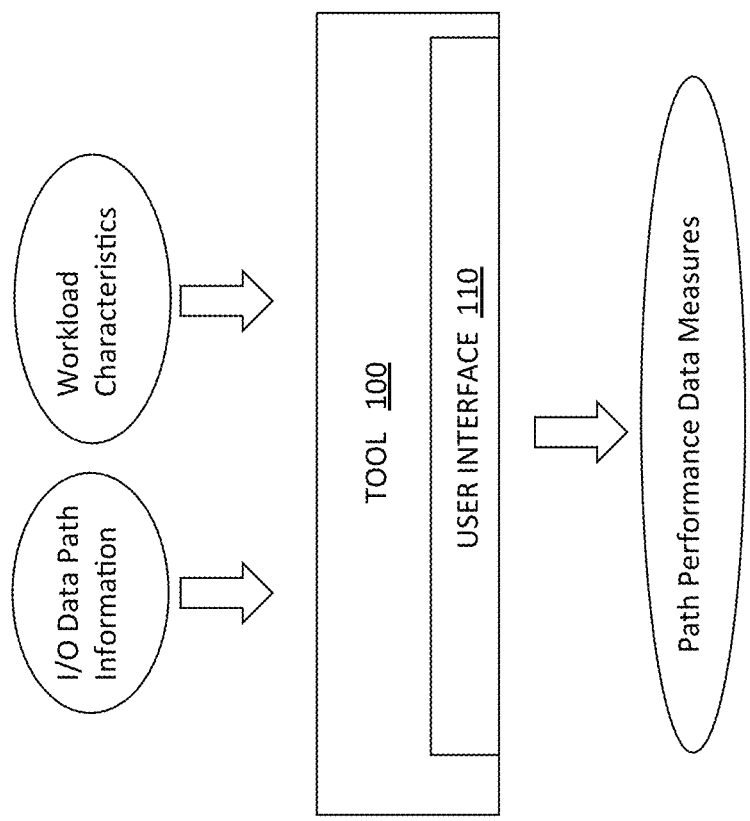
FIG. 5 is a schematic illustration of an tool, application and/or utility having a user interface that may receive as input path data identification information and workload characteristics of element of the path and output collected performance data metrics according to an embodiment of the system described herein.

FIG. 5 is a schematic illustration of an tool, application and/or utility 100, having a user interface 110, that may receive as input path data identification information and performance indicators for workload characteristics of elements of the path and output collected performance data metrics according to an embodiment of the system described herein. Workload characteristics may include for each configuration item (CI) of the I/O path from a host to a storage device, through a SAN, such as the average number of I/Os per unit time (e.g., seconds), the write percentage and/or the average amount of data per unit time (e.g., number of MB per second), among other appropriate characteristics and performance indicators. The user interface 110 of the tool 100 may allow configuration by a user in connection with turning on and off data collection for multiple I/O paths, as further discussed elsewhere herein. The user interface 110 of the tool 100 according to the system described may then display and/or otherwise output path data performance measures and statistics.

In various embodiment, the tool 100 may be an application installed on an application host or other computer providing SAN administration and/or management functionality and/or may be installed on one or more of the hosts 22a-c coupled to the SAN. In an embodiment, the tool 100 may include a ProSphere® product produced by EMC Corporation that provides storage resource management functionality. It is noted that statistics used by the tool 100 according to the system described herein may be gathered by the tool itself and/or may be obtained from other sources, such as, for example, data obtained from products produced by EMC Corporation including, the EMC Workload Analyzer (WLA), the Symmetrix Performance Analyzer (SPA)® and/or the Symmetrix CLI statistics collection daemon (STP), among other possible collection devices, applications and/or tools. Reference is made, for example, to U.S. Pat. No. 6,622,221 to Zahavi, entitled "Workload Analyzer and Optimizer Integration," which is assigned to EMC Corporation and is incorporated herein by reference and which discloses techniques used in connection with evaluating the performance of proposed device swap plans in accordance with past performance data collected. Additionally, the system described herein may be used in connection with the systems and methods disclosed in U.S. patent application Ser. No. 12/807,943 to Colon et al., filed Sep. 17, 2010, also assigned to EMC Corporation, entitled "Techniques for Identifying Devices Having Slow Response Times," which is incorporated herein by reference and which provides techniques for identifying one or more data storage volumes, such as one or more logical volumes, exhibiting a performance problem, such as long response times.

The tool 100 according to the system described herein provides for controlled tuning performance data collection through a single application control. In an embodiment, performance data collection may be turned on or off from the application host running the tool 100 via the user interface 110. The tool 100 may automatically (e.g., without user intervention) update performance data collection characteristics as the application host I/O data path changes according to user controlled settings but without requiring further user intervention during the updating. In various embodiments, the tool may update continuously and/or at specified intervals. Turning on path performance data collection on the application host via the user interface 110 may automatically set up synchronized performance data collection for all managed objects within an I/O data path.

A data I/O path, like the data I/O path 70, may be made up of managed objects from the application host, such as host 22a, though multiple switches 61, 62 in the SAN fabric 60 down to the storage device 24a to which the application host (host 22a) is connected (see FIG. 4). Over time, as the components of the SAN change (e.g., host adapter gets replaced, switch ports are changed and/or storage devices get swapped out) the system described herein may automatically determine what has changed for any I/O data path for the application host and adjust what performance data is to be collected and may ensure collection continues to be synchronized. Such functionality may advantageously be used for troubleshooting performance issues for an application from an end-to-end perspective.

Figure 6:
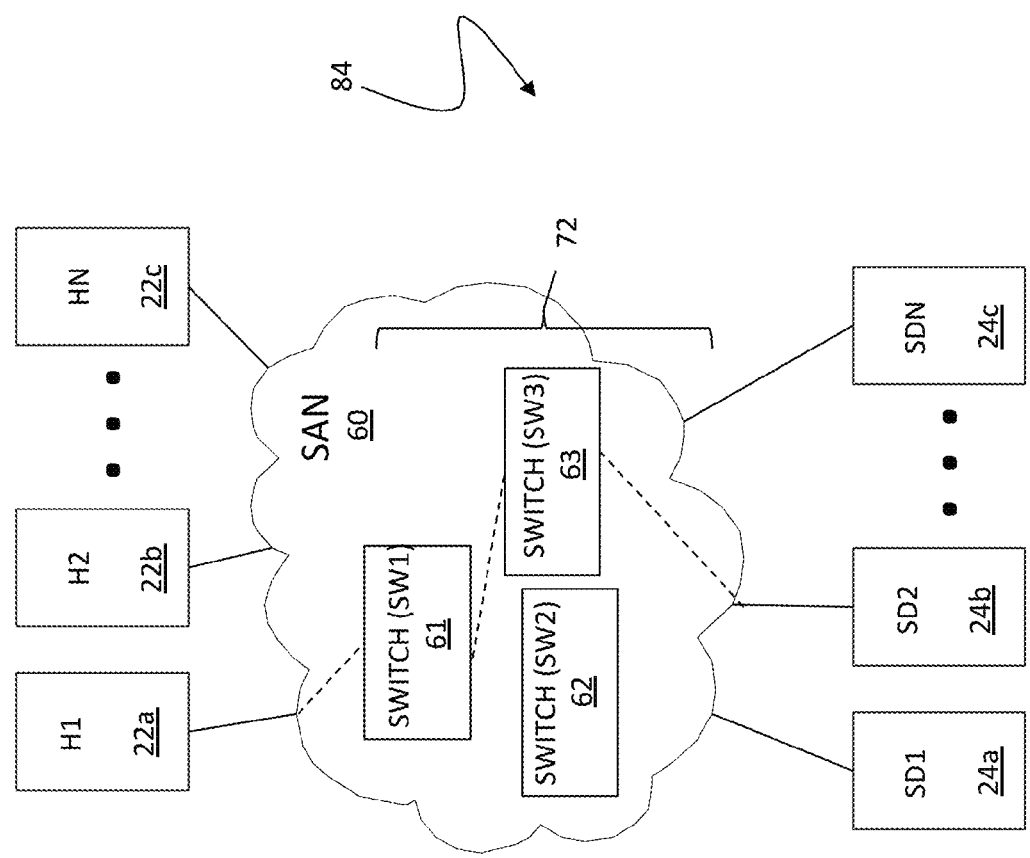
FIG. 6 is a schematic illustration showing a changed I/O data path in the SAN that reflects a change from the I/O data path shown in FIG. 4.

FIG. 6 is a schematic illustration 84 showing a changed I/O data path 72 in the SAN 60 that reflects a change from the I/O data path 70 shown in FIG. 4. A change in the I/O data path of the host 22a is shown schematically in which the I/O data path 72 now includes switch 61 (SW1) and switch 63 (SW3), instead of switch 62 (SW2), and a storage device has been swapped such that I/O data path of the host 22a is now includes the storage device 24b (SD2) rather than storage device 24a (SD1). As further discussed herein, the changes to the I/O path may include, for example, changes to host devices, switches, switch ports, storage devices and/or device ports, among other suitable I/O data path element changes. The tool 100, according to the system described herein, may automatically determine the changes in the I/O data path 72 and adjust the data performance metrics being collected according to the new elements of the I/O data path 72 without requiring any user intervention.

Figure 7:
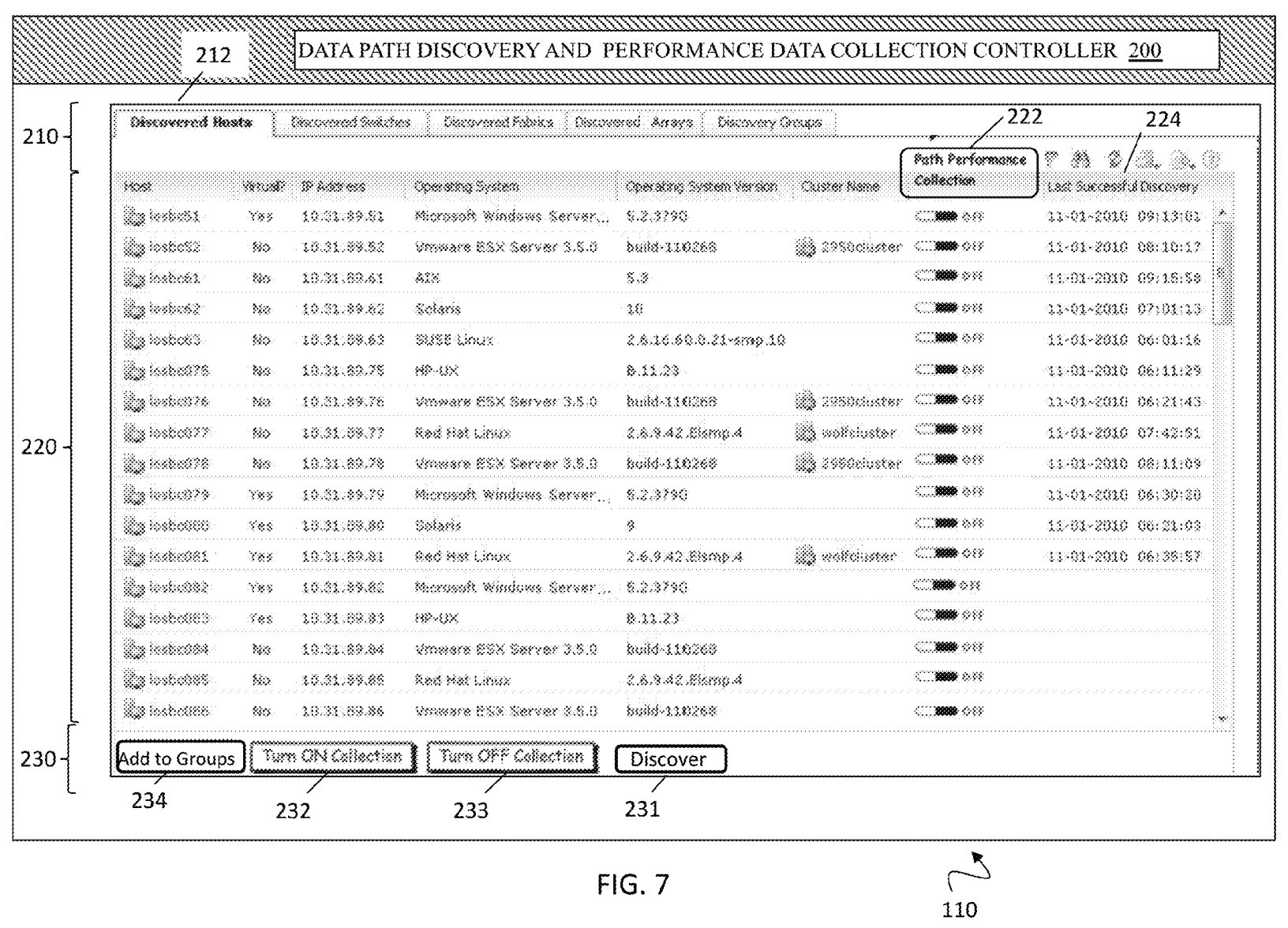

FIG. 7 is a schematic illustration showing an example of a controller 200 of the interface 110 according to an embodiment of the system described herein. The controller 200 may be a screen of the interface 110 and provides data path discovery and performance data collection control functionality in connection with the tool 100. Multiple elements of I/O data paths, such as the I/O data path 70 or the I/O data path 72, may be discovered according to the system described herein in accordance with techniques discussed elsewhere herein. The elements, shown in header section 210, may include discovered hosts, switches, fabrics, arrays, and groups/clusters. The particular header of section 210 shown in the figure corresponds to discovered hosts 212 which may provide an indication of the discovery of complete I/O data paths from one or more hosts through the SAN and elements thereof to one or more storage devices or arrays.

Specifically, section 220 details multiple I/O data paths that have been discovered for multiple hosts. Information of the I/O data paths identifies the discovered hosts, whether the hosts are virtual (e.g., running as guest operating system or a virtual machine (VM)) or not, the hosts' IP addresses, operating systems and versions thereof, and whether the host is in a group or cluster. In connection with the system described herein, column 222 identifies whether data path performance collection has been activated and column 224 identifies when the last successful discovery process performed to identify the hosts and I/O data paths. In an embodiment, the discovery process may be performed automatically, for example, at periodic scheduled intervals. In another embodiment, a user may also use the interface 110 to manually provide for a discovery process in addition to scheduled discovery processes, for example, by activating the Discover button 231 in the section 230 further discussed below.

Section 230 provides for control by a user using the interface 110 of the discovery and path performance data collection processes. As noted above, the Discover button 231 may be used by a user to manual activate a I/O data path discovery process; however, the system described herein may further operate with automatic discovery scans. For any discovered host I/O data path, the interface provides for a single-click control interface to turn on or off path data collection processing for particular I/O data path(s). This is illustrated with the Turn On Collection button 232 and the Turn Off Collection button 233 that may be used for any one or more of the I/O data paths for the discovered hosts shown in the section 220. In an embodiment, the system described herein also provides for grouping host I/O data paths to allow for consolidated analysis of the I/O data paths with a single click using the interface 110. This is illustrated by the Add to Groups button 234, as further discussed elsewhere herein. It is noted that other layouts and configurations for the controller 200, like that of other interface controller screens discussed elsewhere herein, are possible and may be configured according to particular administrator and system policies and requirements.

Figure 8:
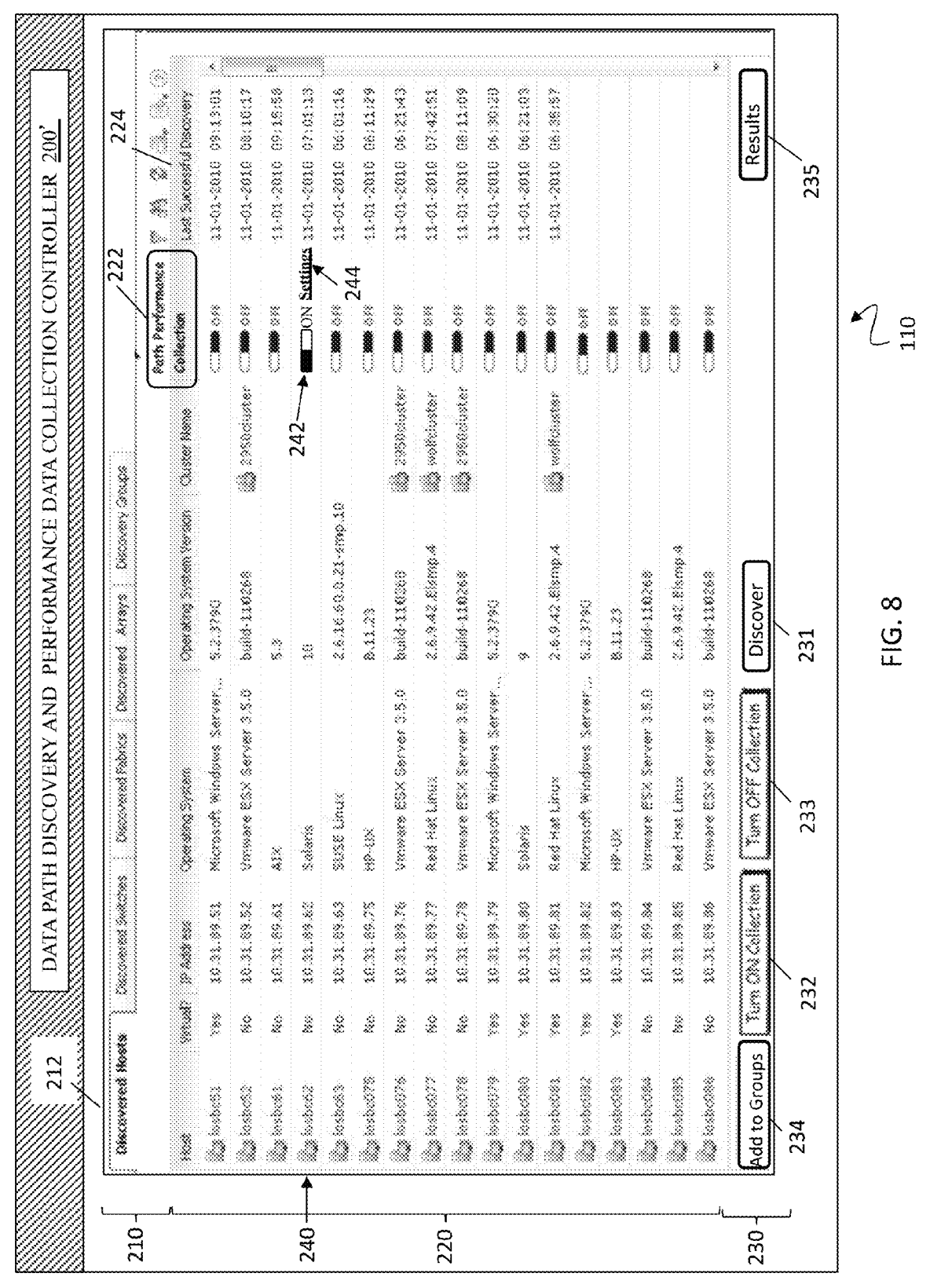

FIG. 8 is a schematic illustration showing a controller 200', like the controller 200, in which, for a host entry 240 for host "losbc62", path performance data collection has been turned on, as shown by the indicator 242, according to an embodiment of the system described herein. In various embodiments, path performance data collection may be turned on by selecting the desired host and clicking on the Turn ON Collection button 232 and/or, alternatively, the indicator 242 may provide for a toggling action between ON and OFF by clicking directly on the indicator 242. When activated, path performance collection may occur for every I/O data path of the host 240, thereby the collection may be synchronized for all elements of the I/O data paths to collect statistics for the elements at the same time. Settings for path performance collection may be controlled by a default settings. For example, the intervals between collection scans may be subject to a default setting. For example, the interval may be 5 minutes, but may be set to any desirable interval. Settings for a specific host may be controlled via the interface 110 by clicking on a Settings link or button 244 for each discovered host for which path performance collection is activated that will allow the user to view and adjust settings from a settings controller, as further discussed elsewhere herein. After path performance collection is activated for at least one host, results of the data collection for I/O data paths of the host may be viewed by clicking on a Results button 235, as further discussed elsewhere herein.

FIG. 9 is a schematic illustration showing a controller 300 that may be another screen of the interface 110 according to an embodiment of the system described herein. The controller 300 shows identification of discovered arrays/storage devices of a SAN, similar to the display of discovered hosts shown in connection with interface screens of the controllers 200, 200'. It is noted that screens similar to that described for the controller 300 may be provided for other discovered elements including discovered switches and fabrics of the SAN, as illustrated by the tabs in section 310. Section 320 shows discovered arrays that have been discovered by one or more discovery scans. In an embodiment, the discovery process may be performed automatically, for example, at periodic scheduled intervals. In another embodiment, a user may also use the interface 110 to manually provide for a discovery process in addition to scheduled discovery processes, for example, by activating the Discover button 331 in section 330 further discussed below.

The section 320 provides various information concerning discovered arrays including name, vendor, model, microcode and time of last update. Additionally, column 324 shows the Discovery state or status of the arrays. For example, a successful discovery may indicate that a particular array has been identified and all relevant information for inclusion in an I/O data path identified, whereas a failed discovery may indicate that certain information from the particular array has not been determined by the last discovery scan. The system may attempt to resolve failures with periodic scans. A status of "Running" may indicate that the array is in an I/O data path for which performance data is currently being collected. Column 322 shows whether path performance collection has been turned on or off for the array. For example, in the illustration, for the array entry 340 for "000194900143," the path performance collection indicator 342 shows that path performance collection is turned on for the array, thereby the array is in an I/O data path for which performance data is being collected. For example, the array 340 may be in one or more of the I/O data paths for the host losbc62 (see FIGS. 7 and 8) for which collection of path performance data has been turned on.

A settings link/button 344 may be used to identify the settings and other collection information, such as identification of the I/O data path, for the array 340, as further discussed elsewhere herein. Buttons 332 and 333 of the section 330 may be used to turn performance data collection on or off for a particular array. This level of control may enable problem identification in particular elements (arrays, switches, fabric etc.) of an I/O data path. A results button 335 may be used to view displayed results of the performance data collection, as further discussed elsewhere herein.

Figure 10:
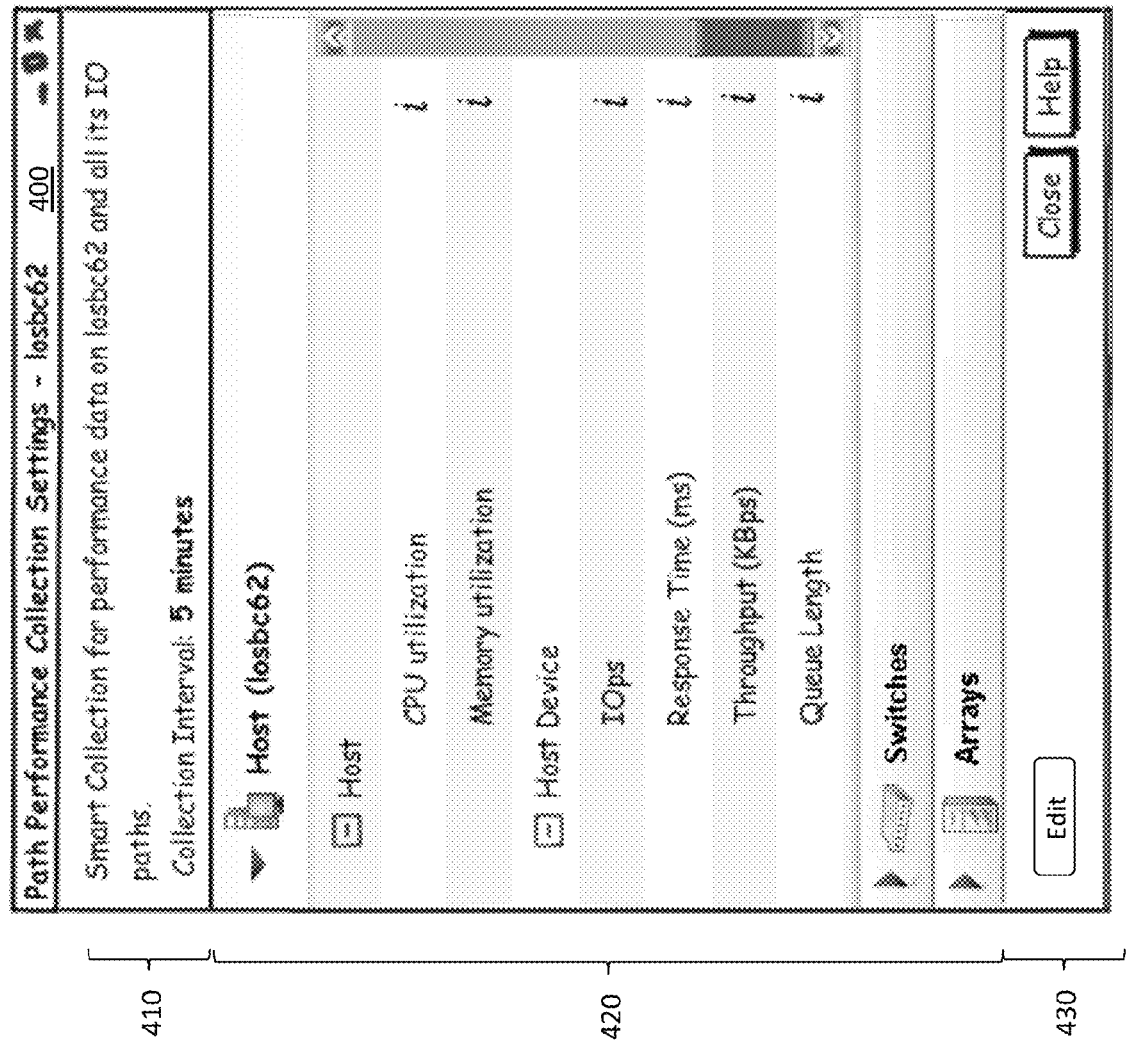
FIG. 10 is a schematic illustration of a path performance collection settings controller that may be a screen of the user interface according to an embodiment of the system described herein.

FIG. 10 is a schematic illustration of a path performance collection settings controller 400 that may be a screen of the user interface 110 according to an embodiment of the system described herein. In the figure, the settings for the path performance collection for the host losbc62 are being illustrated. Section 410 shows the schedule for the automated "smart" collection of performance data for all I/O data paths for host losbc62. Section 420 enables selection and viewing of collection setting information for particular elements of the I/O data paths of the indicated host, including but not limited to workload and performance characteristics such as CPU utilization, memory utilization for the host and IOps (I/O in Mb per sec), response time in ms, throughput in Kbps, and queue length for host devices. Other elements for which information may be obtained include the switches and arrays, as shown in section 420. Section 430 shows buttons that allow the user to edit settings of the path performance data collection, among other control functionalities.

Figure 11:
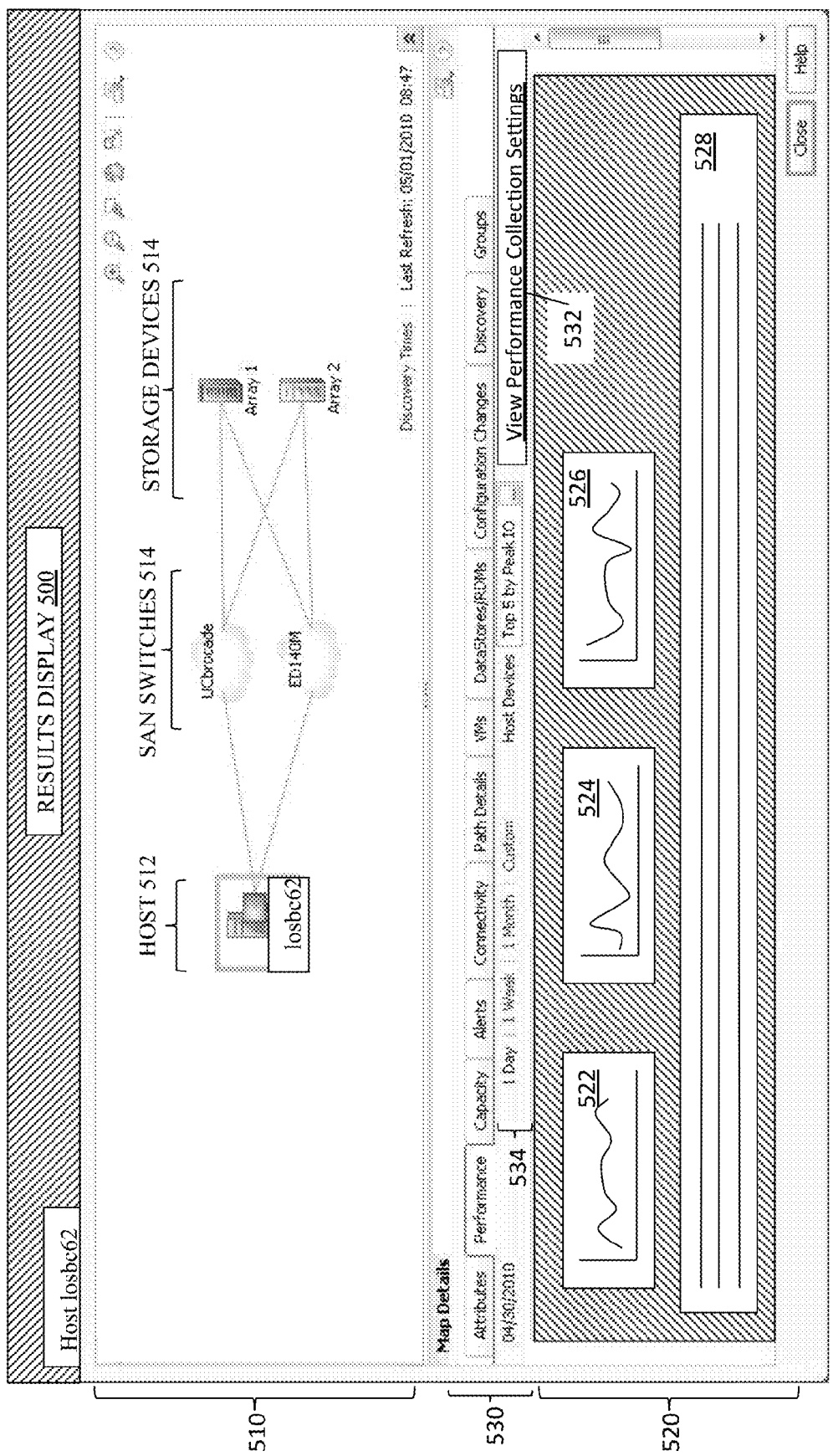
FIG. 11 is a schematic illustration showing a results display according to an embodiment of the system described herein.

FIG. 11 is a schematic illustration showing a results display 500, for example, after clicking on the results button 235 according to an embodiment of the system described herein. The results display 500 may include a graphical section 510 that shows a visual representation of an I/O data path for the selected host, in the illustrated case, for host losbc62. For example, the section 510 graphical displays the host 512, coupled via SAN switches 514, to one or more storage devices/arrays 516. Section 520 may display map details of the I/O data paths, for example performance data for particular elements of the I/O data paths in graph form 522, 524, 526 as well as in text or tabulated form 528. The performance measures displayed may include those discussed elsewhere herein, including workload and performance characteristics such as CPU utilization, memory utilization for the host and IOps (I/O in Mb per sec), response time in ms, throughput in KBps, and queue length for host devices, switches, arrays etc., among other appropriate measures.

Section 530 indicates that multiple types of detail and performance measures may be displayed in various forms for the application host, including features corresponding to the I/O data path attributes, performance, capacity, alerts, connectivity, path details, virtual machine (VM) information, data stores, configuration changes, discovery details and group details. A link button 532 may be provided to view performance collection settings. Additionally, portion 534 indicates that historical or past performance data collection may be maintained by the system. For example, a user may view past performance data collection from the prior day, prior week, prior month and/or any other customizable date range.

Figure 12:
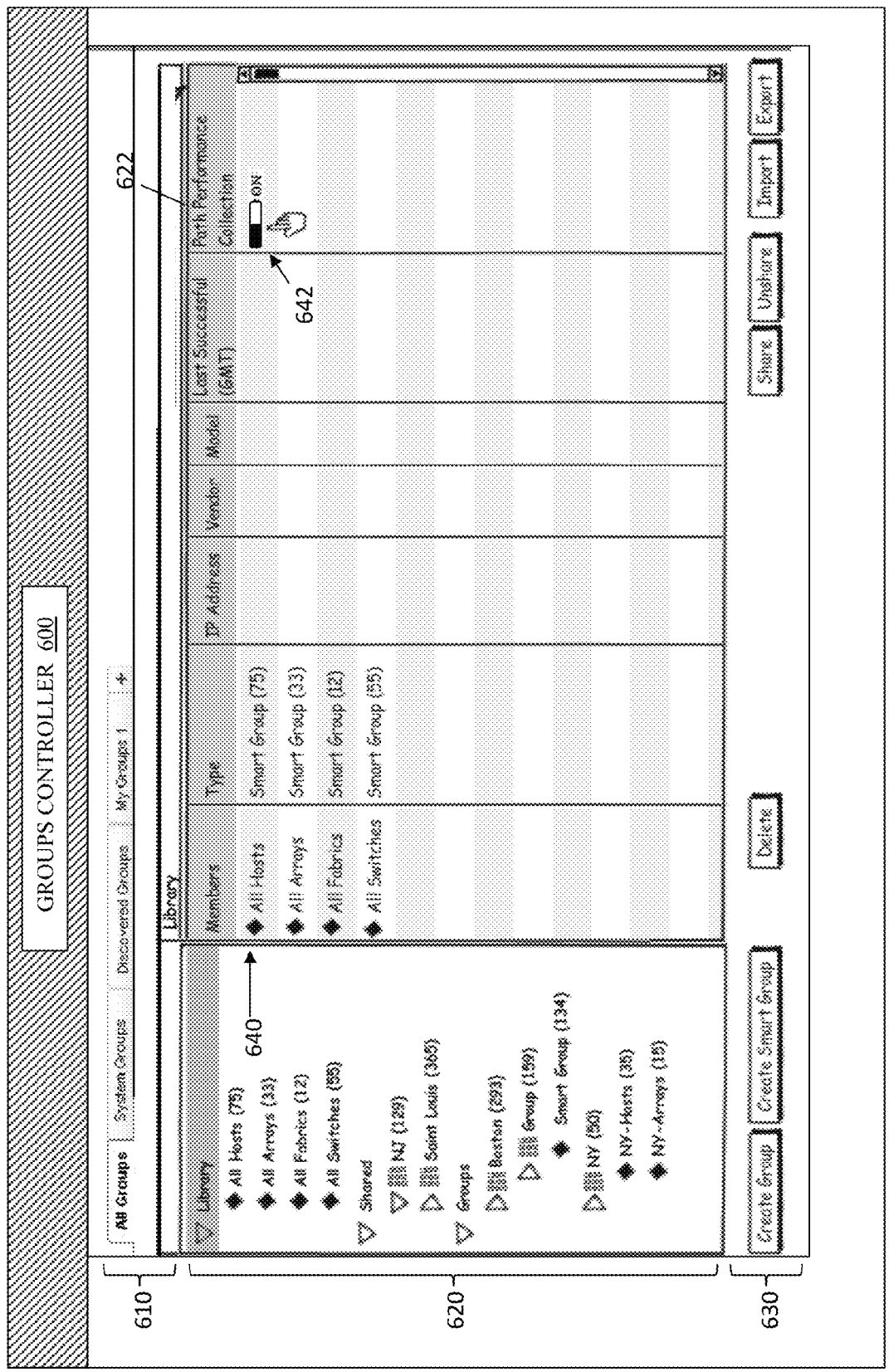
FIG. 12 is a schematic illustration showing a groups controller that may be provided by the interface according to an embodiment of the system described herein.

FIG. 12 is a schematic illustration showing a groups controller 600 that may be provided by the interface 110 according to an embodiment of the system described herein. The group controller 600 enables the selection, creation and configuring of groups of elements in I/O data paths according to the system described herein. Groups may be defined using default settings for the entire group (e.g., Groups) and/or may be configurable with specific collection settings within a group (e.g., Smart Groups). Section 610 shows the identification of various group types and subsets thereof. Section 620 shows specific information concerning selected groups and may include information for groups of hosts, arrays, fabrics, switches etc. of the I/O data paths. Column 622 shows the indicators for whether path performance collection is turned on or off for particular groups. In the illustrated embodiment, an indicator 642 shows that path performance collection is turned on for a group of hosts 640. Section 630 shows buttons that may be used to create and delete groups and smart groups according to configurations by the user. Information concerning groups may also be shared and unshared and imported and exported, as shown by buttons in the section 630. It is noted that group settings may be created and/or shared among groups of varying geographical regions (e.g., Boston, Saint Louis, New York etc.).

Figure 13:
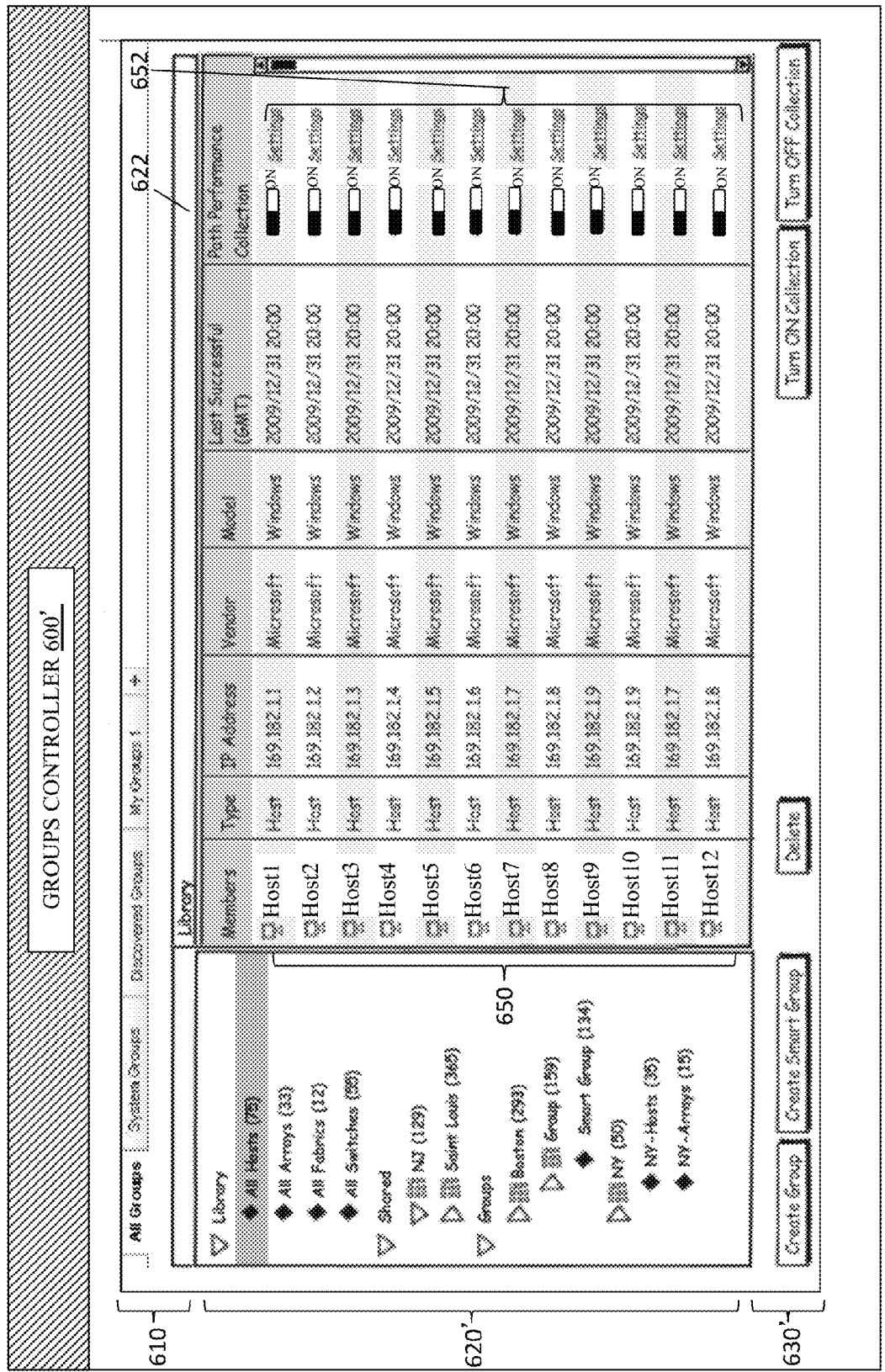
FIG. 13 is a schematic illustration showing more specific information in a section concerning a group of hosts according to an embodiment of the system described herein.

FIG. 13 is a schematic illustration showing more specific information in a section 620' concerning a group of hosts 650 according to an embodiment of the system described herein. Hosts 1-12 650 are shown in the illustrated screen window and it is noted that the turning of path performance collection on for the entire group in FIG. 12 has turned on path performance collection for the I/O data paths of each of the Hosts 1-12 650 as shown by the indicators 652 in accordance with the system described herein. Section 630' shows Turn ON Collection and Turn OFF Collection buttons that may be used to turn on or off collections for individual ones of the selected host group. Other configurations and groups designations may be specified by a user according to desired administrator and/or system requirements.

Figure 14:
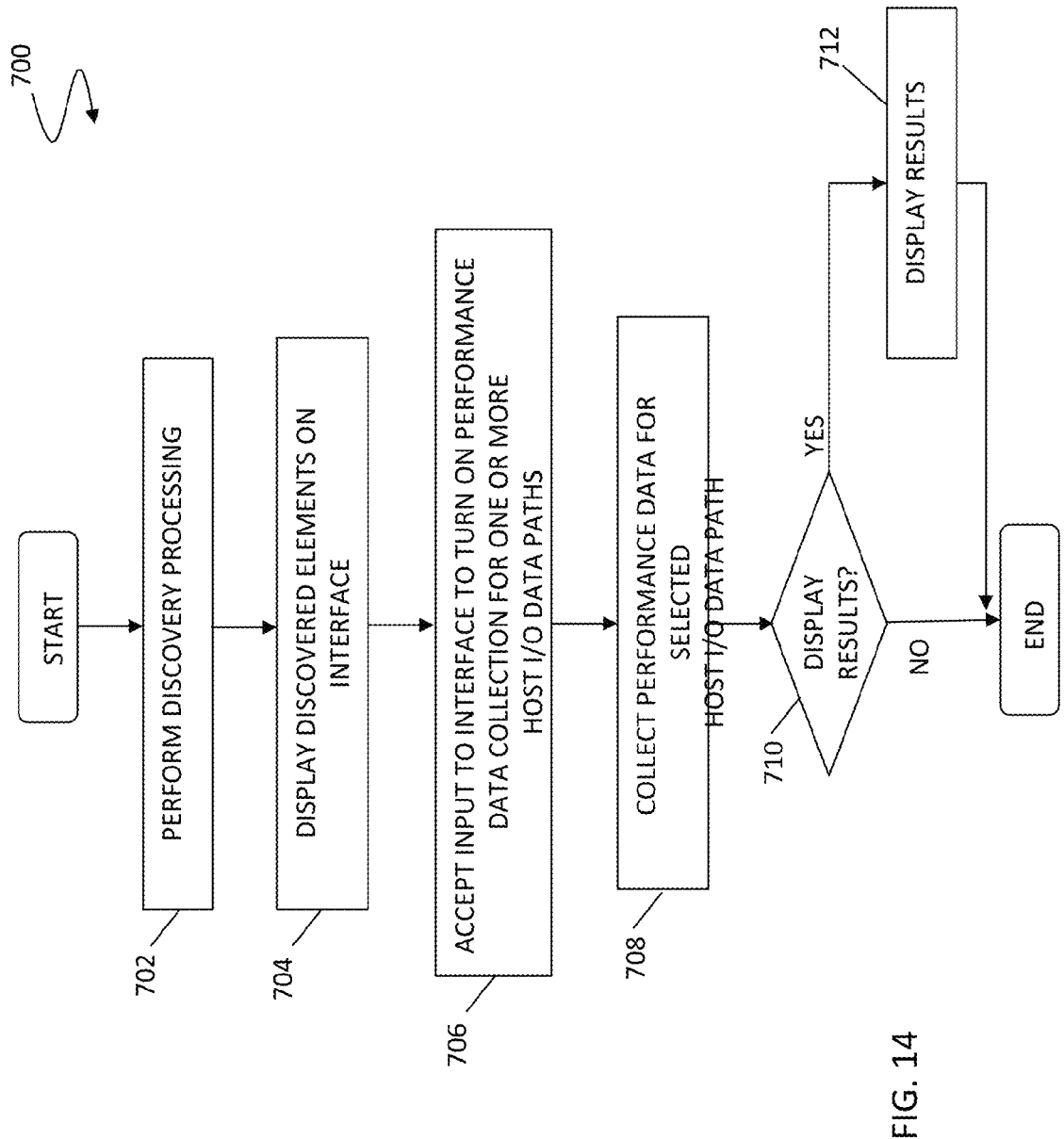
FIG. 14 is a flow diagram showing an iteration of path discovery processing and path performance data collection processing according to an embodiment of the system described herein.

FIG. 14 is a flow diagram 700 showing an iteration of path discovery processing and path performance data collection processing according to an embodiment of the system described herein. At a step 702, a discovery process is performed to identify elements of a SAN through which one or more I/O data paths of one or more host exist. I/O data paths may exist from one or more hosts to one or more storage arrays or devices via switches and/or other elements of the SAN. In an embodiment, the discovery process may be automated to occur continuously and/or at scheduled intervals. Accordingly, the process may automatically identify changes to I/O data paths that may occur as a result of changes to the elements of the SAN without requiring user intervention. In this way, the system is self-tuning to respond to the changes in I/O data paths without requiring that the user have information or knowledge concerning the I/O data path changes. Settings controlling the automation may be set and/or otherwise controlled via a user interface, as further discussed elsewhere herein.

After the step 702, processing proceeds to a step 704 where the discovered elements from the discovery process may be displayed on the user interface. The discovered elements may include one or more hosts from which one or more I/O data paths extend. After the step 704, processing proceeds to a step 706 where the interface receives user input to turn on performance data collection for the one or more of the discovered hosts to collect performance data for the I/O data paths thereof. In an embodiment, the input is a single click on a performance data collection indicator and/or an button to turn on collection. After the step 706, processing proceeds to a step 708 where performance data for I/O data paths of the one or more selected hosts is collected. After the step 708, processing proceeds to a test step 710 where it is determined whether the results of the collection are to be displayed. For example, whether the user has requested the interface to display the results. If not then processing of the iteration of performance data collection is complete. If the results are to be displayed, then processing proceeds to a step 712 where the collection results are displayed on the interface. After the step 712, processing of the iteration is complete.

Figure 15:
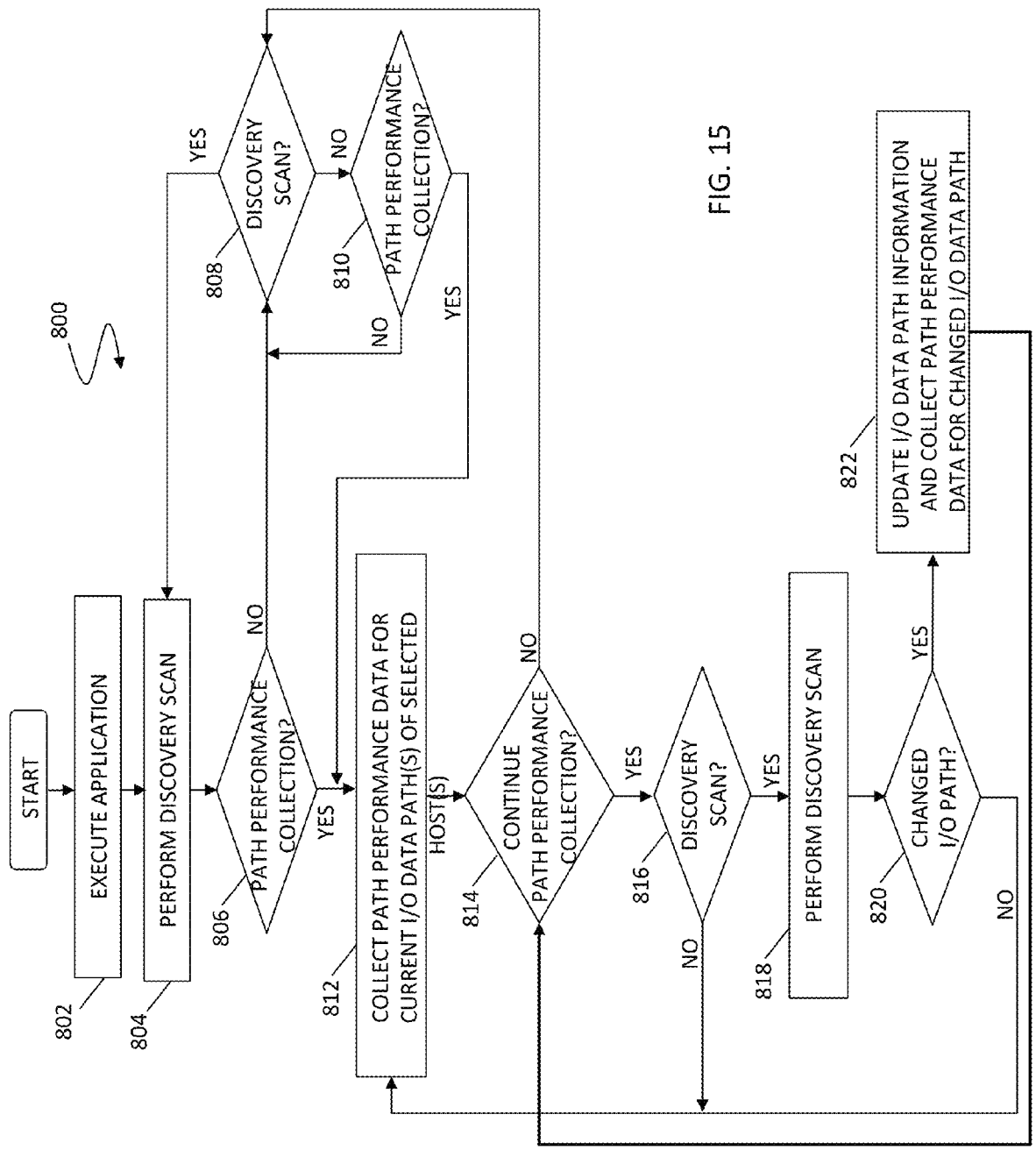
FIG. 15 is a more detailed flow diagram showing the processing of the system described herein for the automated identification of changes in I/O data paths and the collection of path performance data thereof according to an embodiment of the system described herein.

FIG. 15 is a more detailed flow diagram 800 showing the processing of the system described herein for the automated identification of changes in I/O data paths and the collection of path performance data thereof according to an embodiment of the system described herein. At a step 802, an path performance data collection application according to the system described herein is executed. The flow diagram 800 shows processing of the application for path performance data collection until the application is closed. After the step 802, processing proceeds to a step 804 where discovery processing is performed to discover elements of one or more storage area networks, including hosts and storage arrays, according to the system described herein. After the step 804, processing proceeds to a test step 806 where it is determined whether path performance collection processing has been activated for one or more of the discovered hosts. In an embodiment, path performance collection processing may be activated, for example, via an interface by an user clicking, with a single click, on a path performance collection button or indicator.

If no path performance collection processing has been activated at the test step 806, then processing proceeds to a test step 808 where it is determined whether another discovery scan is to occur according to the scheduled intervals for discovery scans for automatically updating the discovery processes according to the system described herein. Discovery scans may be scheduled through the interface. If it is time for a scheduled discovery scan, then processing proceeds back to the step 804. Otherwise, processing proceeds from the test step 808 to a test step 810 where it is determined whether any performance data collection processing has been activated by a user. If not then processing proceeds back to the test step 808. In this way, the system described herein provides for automated and continuous discovery scanning while a path performance data collection application is active.

If at the test step 810, and, likewise at the test step 806, it is determined that path performance collection processing has been activated via the interface, in a manner as discussed elsewhere herein, then processing proceeds to a step 812 where path performance data is collected for all I/O paths of one or more discovered hosts according to the selections made via the interface. After the step 812, processing proceeds to a test step 814 where it is determined whether path performance data collection is to continue. For example, it is determined whether a user has turned off collection for the selected hosts via the interface. If path performance data collection is not to continue as determined at the test step 814 (e.g. the user has clicked on the turn off collection button/indicator) then processing proceeds back to the test step 808 where it is again determined whether another scheduled discovery scan is to occur to update the discovered elements, as discussed above.

If, at the test step 814, it is determined that path performance data collection is to continue, then processing proceeds to a test step 816 where it is determined whether another scheduled discovery scan is to occur. If not then processing proceeds back to the step 812 where the system continues to collect path performance data for the I/O data path(s) of the selected host(s). If, at the test step 816, it is determined that it is time for another scheduled discovery scan, then processing proceeds to a step 818 where the discovery scan is performed. After the step 818, processing proceeds to a test step 820 where it is determined whether any of the I/O data paths of the selected host(s) have changed. If not, then processing proceeds back to the step 812 where the system continues to collect path performance data for the current I/O data path(s) of the selected host(s). If, however, at the test step 820, it is determined that one or more of the I/O data paths have changed, then processing proceeds to a step 822 where the I/O data path information is updated automatically by the system described herein and path performance data for the changed I/O data paths is collected. After the step 822, processing proceeds back to the test step 814 where it is determined whether path performance data collection is to continue. Accordingly, the system described herein provides a self-tuning path performance data collection system using a single application control interface that may automatically and continuously update host I/O data path changes without requiring user intervention to detect and process the changes.

It is further noted that the system described herein may be used in connection with simulation of data storage systems for evaluation purposes. For example, I/O data paths of simulated storage system configurations may be evaluated to determine preferred configurations and/or identify potential problems of a possible I/O data path and elements thereof. Suitable data storage system simulation tools that may be used in connection with the system described herein may include systems and methods like that disclosed in U.S. Pat. No. 7,392,360 to Aharoni et al., entitled "Method and System for Capacity Planning and Configuring One or More Data Storage Systems," U.S. Pat. No. 7,292,969 to Aharoni et al., entitled "Method and System for Simulating Performance on One or More Storage Systems," and U.S. patent application Ser. No. 13/065,806 to Smirnov et al., filed Mar. 30, 2011, entitled "Write Pacing Simulation Tool," which are all assigned to EMC Corporation and which are all incorporated herein by reference.

In other embodiments, the system described herein may be used in connection with management of performance data collection based on a defined groups framework, such as a user defined groups (UDG) framework, in which selected groups are created, based on specified criteria, that contain objects (e.g., hosts, arrays, switches etc.) for which performance data should be collected. According to the system described herein, one or more members of a selected group may be queried to determine for which elements performance data is to be collected. The system described herein simplifies use cases of collecting performance for objects identified by a common criteria. For example, a selected group may be created for a particular grouping of hosts according to specified criteria and performance data collected for objects corresponding to that selected group of hosts.

Figure 16:
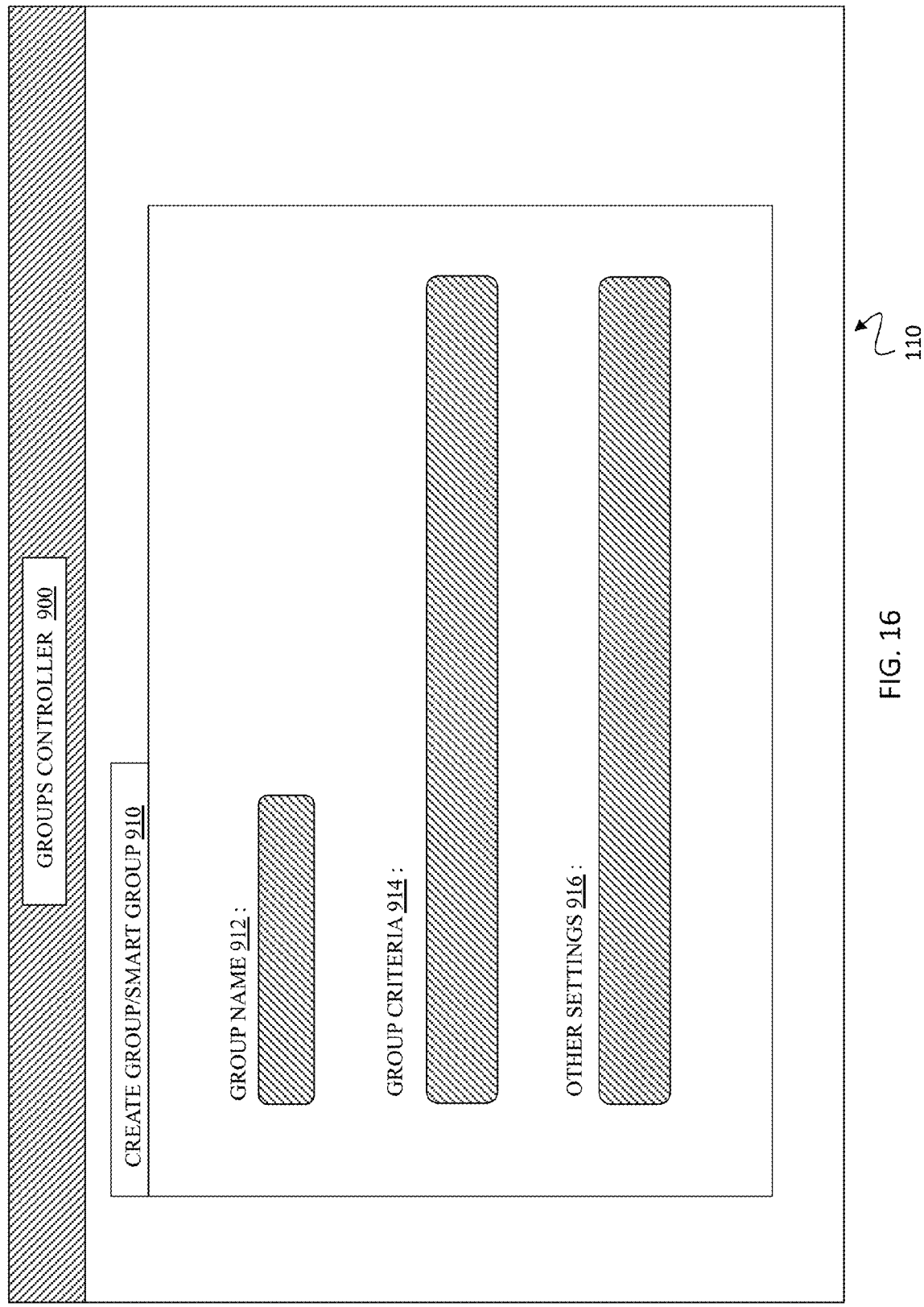
FIG. 16 is a schematic illustration showing a group controller that may be provided using the interface of the tool for path performance collection according to an embodiment of the system described herein.

FIG. 16 is a schematic illustration showing a group controller 900 that may be provided using the interface 110 of the tool 100 for path performance collection according to an embodiment of the system described herein. The group controller 900 may enable creation and/or selection, for example by a user, of a criteria group that is determined according to one or more particular criteria, thereby enabling simplified collection of path performance data for objects having a common criteria. The illustrated embodiment for the group controller 900 shows a group/smart group creation screen 910 that enables a user interface with the tool 100 to name a group 912, identify criteria for the members objects of the group 914 and/or select other settings 916, such as setting collection intervals for performance collection and/or setting whether the performance collection is for the member objects only or for elements of the I/O paths of the member objects. For example, using the group controller 900, a user may identify a group of hosts (e.g., Criteria Group 1; see FIG. 17) according to a particular host type (e.g., Windows hosts) for which performance data may be collected for the member hosts. In various embodiments, information for the elements 912, 914, 916 may be entered by a user and/or may be selected by a user from predetermined criteria selection options.

In various embodiments, one or more different criteria may be applied to designate and select groups of objects for a criteria group for which performance data maybe collected, including criteria for selecting groups of hosts, arrays, switches, etc. and/or combinations thereof. Criteria for group selection may include particular types of objects (e.g., a particular type of hosts, arrays, switches etc., such as Windows hosts, for example) and/or may be based on other attributes or characteristics of objects. In an embodiment, group membership criteria may include processing characteristics of objects. In various embodiments, performance data may be collected for member objects of the groups and/or performance data may be collected for all elements of I/O data paths to and from the member objects of the group.

In an embodiment, the selected group may be a smart group in which membership within the particular group may be automatically updated according to the system described herein, for example, continuously and/or at periodic intervals. In this way, performance data may be automatically collected for objects when such objects newly-fall under a particular criteria for a selected group. According to the system described herein, determination of which objects are selected path performance data collection may be determined by the group controller rather than by the performance data collection controller. Additionally, elements of one or more I/O paths for a particular selected group for which performance data is to be collected may be determined according to the group controller rather than determined by the performance data collection controller, as further discussed elsewhere herein. Accordingly, the system described herein provides for advantageously reducing and/or eliminating processing by the performance data collection controller to determine objects and I/O path elements for performance data collection.

Figure 17:
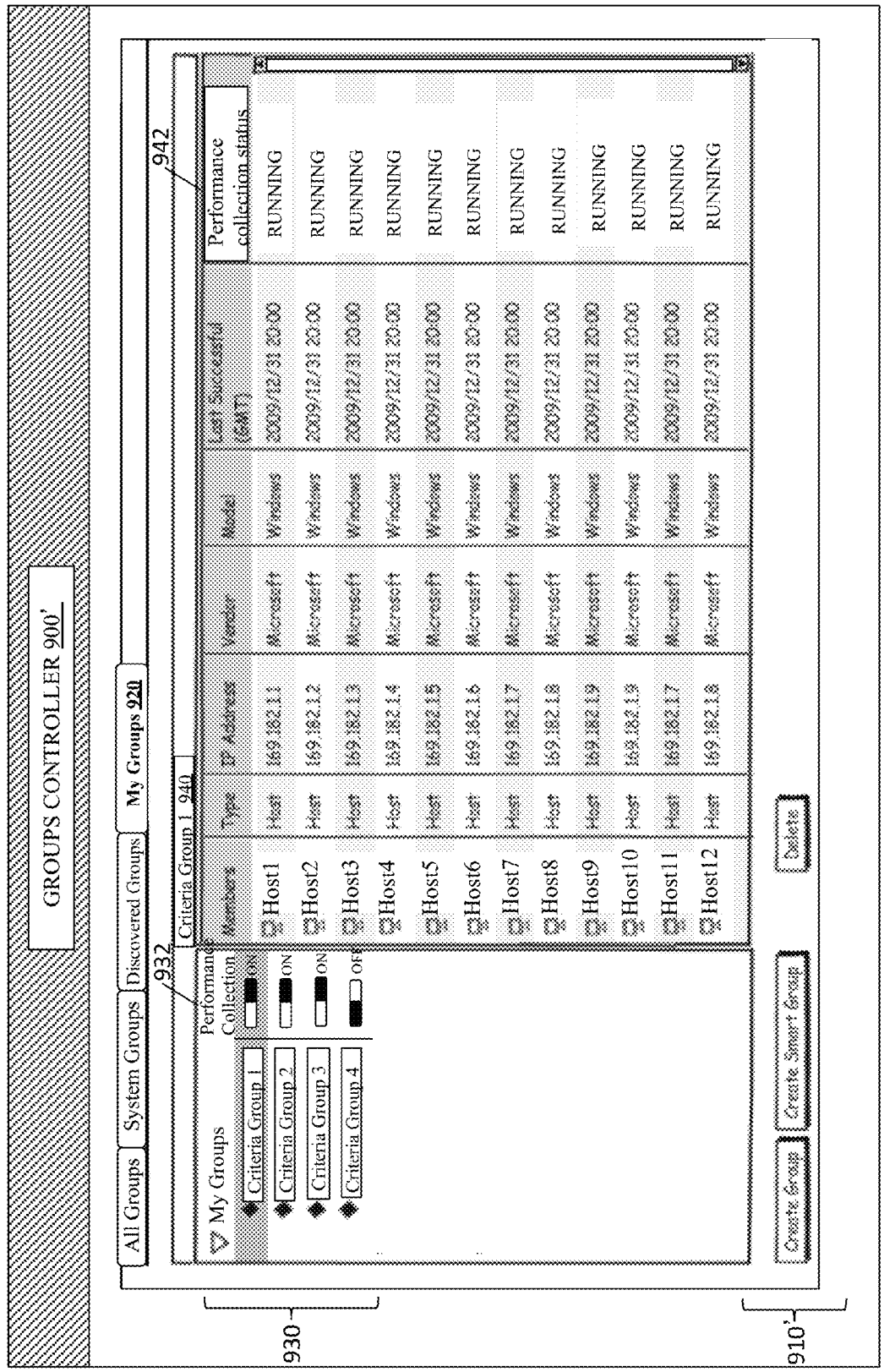
FIG. 17 is a schematic illustration showing a group controller screen that may be provided by the interface of the tool and that presents information in connection with control of performance data collection for one or more selected criteria groups according to an embodiment of the system described herein.

FIG. 17 is a schematic illustration showing a group controller screen 900' that may be provided by the interface 110 of the tool 100 and that presents information in connection with control of performance data collection for one or more selected criteria groups according to an embodiment of the system described herein. Controls 910' may be used to create criteria groups and/or smart groups as discussed in connection with FIG. 16 based on one or more criteria. The criteria groups created in in accordance with the controls 910' may be shown in a My Groups tab 920 of the screen 900' in which the created criteria groups are shown in an accessible list 930 (criteria groups 1-4). According to the system described herein, performance collection may be controlled for one or more of the criteria groups to simplify use cases for collecting performance data for objects identified by a common criteria.

Section 932 shows the indicators for whether performance collection is turned on or off for particular criteria groups. In an embodiment, the indicators of 932 may be used by a user to turn performance collection on or off for the criteria groups. Alternatively, other mechanisms may be used to turn performance collection on or off for criteria groups. In the illustrated embodiment, performance collection is shown as on for criteria group 1 and details of the member objects for which performance data is being collected is shown in the section 940. In an embodiment, criteria for membership in the criteria croup 1 may be, for example, whether a host is a Windows host. The section 940 identifies the member objects (Hosts 1-12), and particular details of the member Hosts 1-12 are further shown including details in column 942 concerning performance collection status for each of the Hosts 1-12. For example, in the illustrated embodiment, performance collection is shown as running for all of the member hosts. If an attempt to performance collection for any or more of the hosts failed, this would be then be indicated as appropriate.

Results of the performance collections may be displayed using an interface of the tool 100 like that shown, for example, in connection with results display 500 discussed elsewhere herein. As discussed elsewhere herein, the performance data collection may be for the member objects (e.g., hosts, arrays, switches etc.) of the group and/or also including elements of I/O paths of the member objects. According to the system described herein, processing for membership in a group may be separated (and automatically updated) and performed by a controller different from the controller performing the performance collection processing. In this way, the system described herein provides a simple, reliable and easily expandable system for performance collection using controlled criteria groups in a variety of use cases.

FIG. 18 is a flow diagram 100 showing processing for groups based performance data collection according to an embodiment of the system described herein. At a step 1002, a criteria group for performance data collection is selected and/or or created, for example, as defined by criteria input by a user. After the step 1002, processing proceeds to a step 1004 where member objects of the criteria group are discovered and/or otherwise added to the criteria group. After the step 1004, processing proceeds to a step 1006 where performance data is collected for the member objects of the criteria group. As discussed elsewhere herein, the performance data collection may be for the member objects of the criteria group and/or also including elements of I/O paths of the member objects. It is noted that, in connection with this step, results of the performance data collection may be displayed, as further discussed elsewhere herein. The performance data collection may be performed using a single tool or application, as further discussed elsewhere herein. After the step 1006, processing proceeds to a test step 1008 where it is determined whether membership in the criteria group is to be updated. As further discussed elsewhere herein, membership in a criteria group may be updated automatically at periodic intervals according to the system described herein. In other embodiments, updating may be also be performed by an action of the user.

If, at the test step 1008, it is determined that an updating of group membership is to be performed, then processing proceeds back to the step 1004. Otherwise, if no updating is to be performed (e.g., a periodic update interval time has not yet been reached), then processing proceeds to a test step 1010 where it is determined whether performance data is to still be collected for the criteria group. If so, then processing proceeds back to the step 1006. Otherwise, if performance data is no longer to be collected for the criteria group, then processing is complete.

In another embodiment, the system described herein may further be used in connection with efficient management of a set of objects requiring performance data collection for specific time intervals using managed groups. A system managed group, that may or may not be exposed to a user, may be defined for a particular interval in which performance data is to be collected for member objects. For example, a group "PDC_5" may be created that is to contain objects for which performance data is to be collected every 5 minutes and a group "PDC_15" may be created that is to contain objects for which performance data is to be collected every 15 minutes. Other groups for any desired interval may similarly be created. In various embodiments, one or more of the time interval groups (e.g., PDC_5, PDC_15 etc.) may be similar to the criteria groups discussed elsewhere herein, in which a criteria is the scheduled time interval for performance collection for member objects of the group.

When a user requests to collect performance for a particular object (e.g., a host) at a specified time interval, such as 5 minutes, the particular object may be added as a member of the appropriate time interval group (e.g., PDC_5). Similarly, when a user requests to collect performance for all members in a user defined group (G1), the group G1 may be added as a member (sub-group) to the appropriate time interval group (e.g., PDC_5). Further, when a user changes a requested time interval for one or more objects or defined groups, for example, changing the performance collection interval for G1 from 5 minutes to 15 minutes, the group G1 may be moved from the group PDC_5 to PDC_15.

As a result, when time comes to collect performance for all objects with a particular scheduled time interval (e.g., 5 minutes), the system described herein provides for simply querying all members of group PDC_5, including direct members and members in subgroups like G1, in one single call to a group management service, and immediately get all of the required elements. The system described herein thereby advantageously hides complexity of managing intervals per object or group (sub-group) from the component or controller responsible for performance data collection.

In another embodiment, the system described herein provides that the group controller, discussed elsewhere herein, may use group management services for identification of element of an I/O path related to hosts or other objects for which performance data is being collected. As further discussed elsewhere herein, a criteria group may be defined based on criteria of an I/O path relationship such that the membership in the criteria group is automatically recalculated and membership is maintained for all objects in the I/O path of a particular host or other object. Accordingly, such groups with I/O path relationship criteria may be included directly within a corresponding time interval group (PDC_x), As a result, a performance data collection query for members of a PDC_x group may return in one call not only performance data for objects for which a user enabled performance data collection, but also all of the elements on the I/O path of the objects, thereby advantageously eliminating additional queries in run time to identify I/O path elements.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for collecting performance data, comprising:
   identifying criteria for membership in a criteria group for which performance data is to be collected;
   determining member objects of the criteria group according to the criteria;
   selectively collecting performance data corresponding to the member objects of the criteria group in accordance with a value of an indicator associated with the criteria group;
   automatically causing an update in membership of the criteria group in response to an I/O data path having changed from a previous iteration, the update being based on changes in discovered I/O path elements by automatically detecting, while selectively collecting performance data, changes in discovered connections and objects used in each discovered I/O path; and
   displaying the discovered I/O paths and corresponding performance data associated with each of the discovered I/O paths.

2. The method according to claim 1, wherein collecting the performance data includes collecting performance data of the member objects.

3. The method according to claim 1, wherein collecting the performance data includes collecting performance data of elements in I/O paths of the member objects.

4. The method according to claim 1, wherein the criteria for membership in a criteria group include object type.

5. The method according to claim 1, wherein the criteria for membership in the criteria group include a scheduled time interval for performing performance data collection for the member objects.

6. The method according to claim 1, wherein collecting performance data corresponding to the member objects of the criteria group is performed by a controller.

7. The method according to claim 6, wherein determining member objects of the group and updating membership of the criteria group is performed using a controller different from the controller that collects the performance data.

8. A non-transitory computer readable medium storing software for collecting performance data, the software comprising:
   executable code that identifies criteria for membership in a criteria group for which performance data is to be collected;
   executable code that determines member objects of the criteria group according to the criteria;
   executable code that selectively collects performance data corresponding to the member objects of the criteria group in accordance with a value of an indicator associated with the criteria group;

executable code that automatically causes an update in membership of the criteria group in response to an I/O data path having changed from a previous iteration, the update being based on changes in discovered I/O path elements by automatically detecting, while selectively collecting performance data, changes in discovered connections and objects used in each discovered I/O path; and executable code that displays the discovered I/O paths and corresponding performance data associated with each of the discovered I/O paths.

9. The non-transitory computer readable medium according to claim 8, wherein the executable code that collects the performance data includes executable code that collects performance data of the member objects.

10. The non-transitory computer readable medium according to claim 8, wherein the executable code that collects the performance data includes executable code that collects performance data of elements in I/O paths of the member objects.

11. The non-transitory computer readable medium according to claim 8, wherein the criteria for membership in a criteria group include object type.

12. The non-transitory computer readable medium according to claim 8, wherein the criteria for membership in the criteria group include a scheduled time interval for performing performance data collection for the member objects.

13. The non-transitory computer readable medium according to claim 8, wherein the executable code that collects performance data corresponding to the member objects of the criteria group is executed by a controller.

14. The non-transitory computer readable medium according to claim 13, wherein the executable code that determines member objects of the criteria group and the executable code that updates membership of the criteria group is executed by a controller different from the controller that collects the performance data.

15. A system for collecting performance data, the system including at least one processor and a memory with software modules stored therein that are executed by the at least one processor, the software modules comprising:

a group controller module that, when executed by the at least one processor, identifies criteria for membership in a criteria group for which performance data is to be collected, determines member objects of the criteria group according to the criteria, and automatically causes an update in membership of the criteria group in response to an I/O data path having changed from a previous iteration, the update being based on changes discovered I/O path elements by automatically detecting, while selectively collecting performance data, changes in discovered connections and objects used in each discovered I/O path; and a performance data collection controller module that, when executed by the at least one processor, selectively collects and displays performance data corresponding to the member objects of the criteria group in accordance with a value of an indicator associated with the criteria group for each of the discovered I/O paths.

16. The system according to claim 15, wherein collecting the performance data includes collecting performance data of the member objects.

17. The system according to claim 15, wherein collecting the performance data includes collecting performance data of elements in I/O paths of the member objects.

18. The system according to claim 15, wherein the criteria for membership in a criteria group include object type.

19. The system according to claim 15, wherein the criteria for membership in the criteria group include a scheduled time interval for performing performance data collection for the member objects.

* * * * *